United States Patent
Ishiguro et al.

(10) Patent No.: US 12,312,552 B2
(45) Date of Patent: May 27, 2025

(54) AGENT FOR FORMING SOLID LUBRICATING COATING FILM, OIL COUNTRY TUBULAR GOODS, THREADED JOINT FOR OIL COUNTRY TUBULAR GOODS, AND METHOD FOR MANUFACTURING OIL COUNTRY TUBULAR GOODS

(71) Applicants: JFE STEEL CORPORATION, Tokyo (JP); TOYO DRILUBE CO.,LTD., Tokyo (JP)

(72) Inventors: Yasuhide Ishiguro, Tokyo (JP); Seigo Goto, Tokyo (JP); Takashi Koga, Tokyo (JP); Takamasa Kawai, Tokyo (JP); Seiji Ozaki, Tokyo (JP); Hideo Sato, Tokyo (JP); Sachiko Fujimoto, Tokyo (JP); Koichi Shoda, Tokyo (JP); Akira Okubo, Tokyo (JP); Ryota Kobayashi, Tokyo (JP); Ryota Kubo, Tokyo (JP); Kota Toyosawa, Tokyo (JP)

(73) Assignees: JFE STEEL CORPORATION, Tokyo (JP); TOYO DRILUBE CO., LTD., Tokyo (JP)

( * ) Notice: Subject to any disclaimer, the term of this patent is extended or adjusted under 35 U.S.C. 154(b) by 0 days.

(21) Appl. No.: 18/564,142

(22) PCT Filed: May 24, 2022

(86) PCT No.: PCT/JP2022/021279
§ 371 (c)(1),
(2) Date: Nov. 27, 2023

(87) PCT Pub. No.: WO2022/255167
PCT Pub. Date: Dec. 8, 2022

(65) Prior Publication Data
US 2024/0254404 A1 Aug. 1, 2024

(30) Foreign Application Priority Data

May 31, 2021 (JP) .................................. 2021-091462

(51) Int. Cl.
*C10M 111/04* (2006.01)
*C10M 103/02* (2006.01)
(Continued)

(52) U.S. Cl.
CPC ......... *C10M 111/04* (2013.01); *C10M 103/02* (2013.01); *C10M 103/06* (2013.01);
(Continued)

(58) Field of Classification Search
CPC ............. C10M 103/02; C10M 103/06; C10M 107/32; C10M 107/38; C10M 111/04;
(Continued)

(56) References Cited

U.S. PATENT DOCUMENTS 6,102,576 A   8/2000  Toyota et al.
6,659,509 B2  12/2003 Goto et al.
(Continued)

FOREIGN PATENT DOCUMENTS

GB   2 205 576 A    12/1988
JP   S63-286435 A   11/1988
(Continued)

OTHER PUBLICATIONS

Jul. 26, 2022 Written Opinion issued in International Patent Application No. PCT/JP2022/021279.
(Continued)

*Primary Examiner* — James C Goloboy
(74) *Attorney, Agent, or Firm* — Oliff PLC

(57) ABSTRACT

A solid lubricating coating film capable of imparting favorable lubricity and corrosion resistance to a connection for oil country tubular goods. Two or more solid lubricants are
(Continued)

dispersed in a binder resin. Graphite is contained in an amount of 50% or more and 90% or less of a total weight of the solid lubricants, and the graphite has a scaly shape and an average particle diameter of 10.0 μm or less. A solid lubricant made of one or more materials selected from BN, mica, talc, MCA, MoS$_2$, PTFE, PFA, and FEP is further contained as other solid lubricants of the two or more types of solid lubricants. The binder resin contains a PEEK resin having an average particle diameter of 20 μm or less as a main component, and the PEEK resin is contained in an amount of 70% or more of a total weight of the binder resin.

14 Claims, 7 Drawing Sheets

(51) Int. Cl.

| | |
|---|---|
| C10M 103/06 | (2006.01) |
| C10M 107/32 | (2006.01) |
| C10M 107/38 | (2006.01) |
| C10M 169/04 | (2006.01) |
| C10M 177/00 | (2006.01) |
| C10N 20/00 | (2006.01) |
| C10N 20/06 | (2006.01) |
| C10N 40/34 | (2006.01) |
| C10N 50/02 | (2006.01) |
| C10N 70/00 | (2006.01) |
| E21B 17/042 | (2006.01) |
| F16L 15/00 | (2006.01) |

(52) U.S. Cl.
CPC ........ *C10M 107/32* (2013.01); *C10M 107/38* (2013.01); *C10M 169/04* (2013.01); *C10M 177/00* (2013.01); *C10M 2201/0413* (2013.01); *C10M 2201/0663* (2013.01); *C10M 2201/0873* (2013.01); *C10M 2201/1033* (2013.01); *C10M 2201/123* (2013.01); *C10M 2209/1033* (2013.01); *C10M 2213/0623* (2013.01); *C10N 2020/06* (2013.01); *C10N 2020/063* (2020.05); *C10N 2040/34* (2013.01); *C10N 2050/02* (2013.01); *C10N 2070/00* (2013.01); *E21B 17/042* (2013.01); *F16L 15/001* (2013.01)

(58) Field of Classification Search
CPC .............. C10M 169/04; C10M 177/00; C10M 2201/0413; C10M 2201/0663; C10M 2201/0873; C10M 2201/1033; C10M 2201/123; C10M 2209/1033; C10M 2213/0623; C10N 2020/06; C10N 2020/063; C10N 2040/34; C10N 2050/02; C10N 2070/00; E21B 17/042; F16L 15/001
See application file for complete search history.

(56) References Cited

U.S. PATENT DOCUMENTS

| | | |
|---|---|---|
| 9,194,515 B2 | 11/2015 | Oshima et al. |
| 10,336,962 B2 | 7/2019 | Goto |
| 11,198,793 B2 | 12/2021 | Sasaki et al. |
| 2008/0277925 A1 | 11/2008 | Goto et al. |
| 2009/0078328 A1 | 3/2009 | Albert et al. |
| 2009/0236850 A1 | 9/2009 | Goto et al. |
| 2010/0264649 A1* | 10/2010 | Goto ..................... F16L 15/001 508/180 |
| 2010/0301600 A1 | 12/2010 | Goto et al. |
| 2013/0277961 A1 | 10/2013 | Goto et al. |
| 2014/0284919 A1 | 9/2014 | Goto et al. |
| 2015/0191674 A1 | 7/2015 | Goto et al. |
| 2015/0192229 A1* | 7/2015 | Goto ..................... C10M 177/00 285/94 |
| 2015/0210888 A1* | 7/2015 | Goto ..................... C10M 173/02 285/70 |
| 2016/0053590 A1 | 2/2016 | Besijn et al. |
| 2016/0160920 A1 | 6/2016 | Karaki et al. |
| 2016/0208194 A1 | 7/2016 | Matsumoto et al. |
| 2017/0167546 A1 | 6/2017 | Satoi et al. |
| 2018/0118251 A1* | 5/2018 | Maeda .................. F16C 33/208 |
| 2018/0201868 A1 | 7/2018 | Goto |
| 2019/0003620 A1 | 1/2019 | Goto et al. |
| 2019/0010767 A1 | 1/2019 | Goto |
| 2020/0157379 A1 | 5/2020 | Sasaki et al. |
| 2020/0166163 A1 | 5/2020 | Goto |
| 2021/0364119 A1 | 11/2021 | Goto |

FOREIGN PATENT DOCUMENTS

| | | | |
|---|---|---|---|
| JP | | H01-289896 A | 11/1989 |
| JP | | H03-168259 A | 7/1991 |
| JP | | H08-103724 A | 4/1996 |
| JP | | H08-105582 A | 4/1996 |
| JP | | H11-199884 A | 7/1999 |
| JP | | 2001-049285 A | 2/2001 |
| JP | | 2001-065751 A | 3/2001 |
| JP | | 2001-099364 A | 4/2001 |
| JP | | 2002-310345 A | 10/2002 |
| JP | | 2002-327874 A | 11/2002 |
| JP | | 2002-348587 A | 12/2002 |
| JP | | 2002-370067 A | 12/2002 |
| JP | | 2004-053013 A | 2/2004 |
| JP | | 2005-299693 A | 10/2005 |
| JP | | 2008-038108 A | 2/2008 |
| JP | | 2008-069883 A | 3/2008 |
| JP | | 2008-527249 A | 7/2008 |
| JP | | 2008-537062 A | 9/2008 |
| JP | | 2011-105831 A | 6/2011 |
| JP | | 2011213761 A | 10/2011 |
| JP | | 2013-108556 A | 6/2013 |
| JP | | 2013-209960 A | 10/2013 |
| JP | | 2013-545940 A | 12/2013 |
| JP | | 2015-506445 A | 3/2015 |
| JP | | WO2017/110685 A1 | 8/2018 |
| JP | | 6776485 B1 | 10/2020 |
| RU | | 2221840 C1 | 1/2004 |
| RU | | 2 729 482 C1 | 8/2020 |
| WO | | 03102457 A1 | 12/2003 |
| WO | | 2006/075774 A1 | 7/2006 |
| WO | | 2006/104251 A1 | 10/2006 |
| WO | | 2009/057754 A1 | 5/2009 |
| WO | | 2009/072486 A1 | 6/2009 |
| WO | | 2014/024755 A1 | 2/2014 |
| WO | | 2014/042144 A1 | 3/2014 |
| WO | | 2015/016322 A1 | 2/2015 |
| WO | | 2015/030252 A1 | 3/2015 |
| WO | | 2015/141159 A1 | 9/2015 |
| WO | | 2017/110686 A1 | 6/2017 |
| WO | | 2018/216416 A1 | 11/2018 |
| WO | | 2019/021794 A1 | 1/2019 |
| WO | | 2020/149310 A1 | 7/2020 |

OTHER PUBLICATIONS

Aug. 2, 2022 Written Opinion issued in International Patent Application No. PCT/JP2022/021281.
Jul. 24, 2024 Extended Search Report issued in European Patent Application No. 22815919.0.
Jul. 12, 2024 Office Action issued in Russian Patent Application No. 2023131333.
Jun. 28, 2024 Office Action issued in Russian Patent Application No. 2023131428.
Jul. 16, 2024 Extended Search Report issued in European Patent Application No. 22815917.4.
U.S. Appl. No. 18/563,107, filed Nov. 21, 2023 in the name of Ishiguro et al.
U.S. Appl. No. 18/564,198, filed Nov. 27, 2023 in the name of Ishiguro et al.

(56) References Cited

OTHER PUBLICATIONS

Jul. 26, 2022 International Search Report issued in International Patent Application No. PCT/JP2022/021279.
Nov. 21, 2023 International Preliminary Report on Patentability issued in International Patent Application No. PCT/JP2022/021279.
Aug. 2, 2022 International Search Report issued in International Patent Application No. PCT/JP2022/021281.
Nov. 21, 2023 International Preliminary Report on Patentability issued in International Patent Application No. PCT/JP2022/021281.
Jul. 19, 2022 International Search Report issued in International Patent Application No. PCT/JP2022/021278.
Nov. 21, 2023 International Preliminary Report on Patentability issued in International Patent Application No. PCT/JP2022/021278.
Jul. 11, 2023 Office Action issued in Japanese Patent Application No. 2022-550246.
Tsuru, E. et al., "Performance properties of tubular connection under hostile well conditions and optimum make-up procedure," Journal of the Japanese Association for Petroleum Technology, vol. 61, No. 6, pp. 527-536, Nov. 1996.
Nov. 6, 2024 U.S. Office Action issued in U.S. Appl. No. 18/564,198.
Sep. 6, 2024 Office Action issued in Russian Patent Application No. 2023131446.
Sep. 6, 2024 Search Report issued in Russian Patent Application No. 2023131446.
Sep. 17, 2024 Extended European Search Report issued in European Patent Application No. 22815916.6.
Mar. 10, 2025 Notice of Allowance issued in U.S. Appl. No. 18/564,198.

* cited by examiner

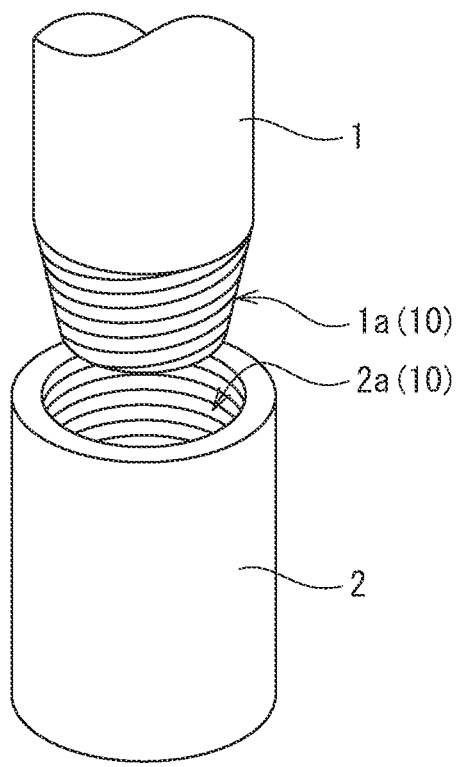

AGENT FOR FORMING SOLID LUBRICATING COATING FILM, OIL COUNTRY TUBULAR GOODS, THREADED JOINT FOR OIL COUNTRY TUBULAR GOODS, AND METHOD FOR MANUFACTURING OIL COUNTRY TUBULAR GOODS

TECHNICAL FIELD

The present disclosure relates to a technology relating to lubrication and corrosion resistance of. The present disclosure also relates to an oil country tubular goods and a threaded joint for oil country tubular goods in which a solid lubricating coating film is formed on a tightening surface (including a metal sealing surface) of a thread portion instead of a wet lubricating compound. In the present specification, the tightening surface which is a surface of the thread portion includes a metal sealing surface.

The solid lubricating coating film means a coating film composed of a binder resin as a matrix component, a solid lubricant dispersed and distributed in the binder resin, and an additive added as necessary. The present disclosure is intended to provide corrosion resistance while improving lubrication by a solid lubricating coating film that realizes lubrication of a connection for oil country tubular goods.

In addition, in the present specification, the phenomena described by the terms "lubricity" and "high lubricity" mean low friction and slippery phenomena in a broad sense. In addition, the high lubricity means that make-up/break-out can be performed in a defined number of times or more (also referred to as number of times of make-up/break-out), in a narrow sense. For example, seizure resistance of a threaded joint for oil country tubular goods is described in the API 5C5 standard. In the API 5C5 standard, it is required that make-up can be performed up to three times in the case of casing size. In addition, it is required that make-up can be performed up to ten times in the case of tubing size.

In the present specification, a pipe having a female thread is sometimes referred to collectively as box. That is, coupling is also described as a type of box.

BACKGROUND ART

In the threaded joint for oil country tubular goods, conventionally, in order to lubricate the thread portion, a surface treatment is performed on a tightening surface (sealing surface) of the thread portion in at least one of a male thread side component and a female thread side component (hereinafter, also simply referred to as "tightening surface") with an Mn phosphate chemical conversion-treated film or electroplating using Cu or the like to form a coating film. Thereafter, a lubricating compound containing Pb, Zn, or the like was applied onto the coating film to achieve lubrication.

In the present specification, when a coating film is formed on a tightening surface (sealing surface) of a thread portion, the tightening surface including the coating film is referred to as tightening surface.

On the other hand, in recent years, a non-wet "dry dope-free" lubrication technology has attracted attention. The "dry dope-free" has meanings that the film itself is not in a viscous liquid form like API-mod compound and that the film does not contain any harmful heavy metal. As such "dry dope-free" lubrication, there is a technology of forming a solid lubricating coating film on a tightening surface to achieve lubrication. The present disclosure is a technology relating to this "dry dope-free" lubrication.

Here, the past patent literatures include inventions relating to various solid lubricating coating films. The solid lubricating coating film is composed of a lubricant component in charge of lubrication and a solid film as a matrix component that retains the lubricant component in the film. The solid film means a non-viscous film which is not a liquid film, and also means that the film completes lubrication at the time of connection make-up and break-out by itself. Conventional Mn phosphate films and Cu electroplating films themselves are solid films. However, these films are on the premise that lubrication is achieved by applying a grease-like compound thereto, and thus are not included in the solid lubricating coating film. In the present disclosure, the solid film achieves lubrication, and an organic resin film is assumed as the solid film. Therefore, in the following description, the solid film is also referred to as binder resin.

In the present disclosure, a main component of the solid lubricant is graphite, and a main component of the binder resin is a PEEK resin.

In the field of lubrication of connection for oil country tubular goods and other lubrication fields, there are few solid lubricants whose main component is graphite. In addition, there are many products including a PEEK resin as a binder resin component. However, it is considered that there is no past patent literature which describes that the PEEK resin is controlled within an appropriate range in consideration of special lubrication conditions (severe lubrication conditions that a large load and an unbalanced load are applied) as with a threaded joint for oil country tubular goods.

As similar technologies, for example, there is PTLs 1 to 6.

PTLs 1 to 3 each relate to an invention relating to a solid lubricating coating film of a connection for oil country tubular goods. PTLs 1 to 3 each exemplify graphite as an example of substances considered as a solid lubricant. PTL 3 also describes that graphite is the best candidate for the solid lubricant.

PTL 4 is not an invention relating to a connection for oil country tubular goods. PTL 4 describes graphite as one of constituent elements in lubricating a bearing. PTL 5 relates to an aqueous agent, and exemplifies graphite as a solid lubricant.

Concerning graphite, it is a widely understood idea that graphite has a feature that a lubrication situation does not change even at high temperatures and that lubrication does not change even under high loads. In addition, graphite has a property that it does not explode and just burns even when it is in a fine powder shape. Hence, graphite is broadly used for lubrication of a plug and a billet in a drilling step for manufacturing a seamless steel pipe, and the understanding of graphite as a stable lubricant has been widely established.

The PEEK resin (also simply referred to as PEEK) is a thermoplastic resin that is stable even at high temperatures, and is known as hard plastic. PEEK is an abbreviation composed of acronyms of Poly Ether Ether Ketone. PEEK is a very hard material. Furthermore, a PEEK added with glass fiber to enhance strength and rigidity, and a PEEK in which PTFE, graphite, carbon fiber, or the like is added to improve lubrication are commercially available. The PEEK resin, as a single product, is sold in a pellet form.

While the number of technologies using the PEEK resin is very limited among past technologies relating to lubrication of connection for oil country tubular goods, for example, PTL 6 describes such a technology. PTL 6 exemplifies a PEEK resin having PTFE dispersed therein.

CITATION LIST

Patent Literature

PTL 1: WO 2014/024755
PTL 2: JP 2008-527249 A
PTL 3: JP 2013-545940 A
PTL 4: JP 6776485 B2
PTL 5: WO 2019/021794
PTL 6: JP 2015-506445 A

SUMMARY OF INVENTION

Technical Problem

However, PTLs 1 to 3 exemplify graphite, but do not clarify a content of the graphite. That is, it is inferred that, in PTLs 1 to 3, the content of graphite ranges from the whole amount of the solid lubricant to zero, and is not particularly conscious.

The PEEK resin described in PTL 6 has a Knoop hardness of Hk 80. PTL 6 is a case of a significantly soft special PEEK resin. A standard hardness of the PEEK resin is a Rockwell hardness of R 120 and a Knoop hardness of HK 963, and the hardness of the PEEK resin of PTL 6 is much lower than the standard hardness. Therefore, PTL 6 is an example of using a dissimilar PEEK resin, and is not proper as the PEEK resin contemplated by the present disclosure.

Lubrication of the connection for oil country tubular goods intended by the present disclosure is in a special sliding situation.

Specifically, on site (actual well), a pin having an actual length of about 8 m or more and less than 15 m is made up and broken out to a box set below. At this time, while the pin is made up and broken out using a power tongue in a state of being lifted by a crane, a total load of the pin may be applied to a box connection. In the present specification, this is referred to as lubrication in a large load-applied state.

At this time, the pin is not always made up and broken out in an ideal state. That is, at the time of make-up, a pin connection is inserted into the box connection or set in a slightly tightened state by hand. However, the pin is not set upright and immobile with respect to the box connection. Nor is the pin set in a state of being erected straight (without deflection) while being inclined in an oblique direction. That is, while a lower portion of the pin is constrained by the box connection, an upper end side, i.e., a tip side opposite to a tightening side, is slightly deflected according to an elastic modulus (Young's modulus) of a material therefor and an actual pin length. In particular, in the case of a pin having a length of 8 m or more, when viewed from below, the pin appears to be deflected while being set straight on the box. The pin is made up and broken out from that state, and thus there is no case where the box connection and the pin connection are made up and broken out in a state of being uniformly and symmetrically loaded. For this reason, make-up/break-out are performed in a state where a part of a thread surface locally strongly contacts (lubrication in an unbalanced load state). In addition, a place where the thread surface locally strongly contacts changes depending on make-up/break-out.

In conventional lubrication technologies using a grease-like compound, the compound moves accordingly during make-up/break-out. Therefore, the lubricant (lubricating compound) functions to converge make-up/break-out in a favorable direction, for example, even when the lubrication conditions slightly varies. Thus, in an evaluation test (also referred to as laboratory test) of make-up/break-out a threaded joint in lubrication technologies using a grease-like compound, it is possible to grasp a lubrication situation of an actual size pin through evaluation using a short pin without relying on evaluation using the actual size pin.

On the other hand, according to the inventor's investigation, in the technology for lubricating a connection for oil country tubular goods using a solid lubricating coating film, the solid lubricating coating film is inevitably scraped to some extent. It is necessary to take ingenuity so as to prevent shavings from being clogged in a thread gap. At this time, secondary formed products derived from the scraped solid lubricating coating film do not always move in conjunction with make-up/break-out.

This phenomenon is what happens in an actual well, which is a great difference from that which happens in the case of lubrication using a wet lubrication compound.

It has been found that the technology for lubricating a connection for oil country tubular goods using a solid lubricating coating film cannot be evaluated similarly as with conventional lubrication technologies using a grease-like compound in a threaded joint for oil country tubular goods, and is evaluated leniently. That is, in the conventional patent literatures, the make-up/break-out of a threaded joint for oil country tubular goods is often evaluated in a state where lubrication is performed using a wet lubrication compound (make-up/break-out test using a short pin) even in the evaluation of a solid lubricating coating film. Therefore, the present inventors have found that the conditions for solid lubricating coating film lubrication (for example, suitable ranges of components) described in the past patent literatures cannot be adopted as they are.

That is, in the case where a solid lubricating coating film is evaluated through a laboratory test, influence of a large load/unbalanced load cannot always be simulated in the evaluation using a short pin similarly as with lubrication using a lubricating compound, for the above reason. It has been found that, in the evaluation using a short pin shorter than that used in the actual situation in a well, the solid lubricating coating film is less likely to be scraped, and that it is impossible to create a situation in which seizure behavior in an actual well can be simulated.

In such conventional evaluation using a short pin, it is not possible to simulate a situation, for example, in which secondary products formed of shavings of the solid lubricating coating film is clogged to cause seizure, or the secondary products are pressed against the tightening surface again to maintain the effect like a lubricating coating film. That is, simply, in the conventional evaluation using a short pin, the solid lubricating coating film is inevitably evaluated leniently. Further, there is a problem that, when a physical property parameter of the solid lubricating coating film is determined, a region that is primarily unacceptable is erroneously evaluated as a suitable range.

For this reason, the inventor has found that, in fact, a suitable range is often described in the conventional prior art literatures on the basis of the lenient evaluation as described above.

The inventors have also found that, under severe conditions, such as make-up/break-out conditions of a threaded joint for oil country tubular goods, under which a large load is applied and an unbalanced load is also applied, even if mere use of graphite as a lubricant, as disclosed in PTLs 1 to 5, is assumed, it does not work well.

An example of the case will be described below.

The example given here is a case where a test was conducted with a 3.5" size connection for oil country tubular goods JFEBEAR (trademark). Only an epoxy resin was used as a binder resin, an agent using only graphite was applied to a solid lubricant, and firing was performed to form a solid lubricating coating film on the box connection side. In addition, a solid lubricating coating film was formed on a pin connection side using a fluororesin as a binder resin and an agent containing PMSQ (polymethylsilsesquioxane) as a solid lubricant. Then, when a make-up/break-out test was conducted with a horizontal power tong, slight seizure occurred after one make-up/break-out, and the solid lubricating coating film was determined as unacceptable. At this time, the thread generated frictional heat to such an extent that they could be touched or could not be touched by work gloves. From this, it was apparent, from the degree of heat generation, that the lubrication was not favorable.

At this time, when the thread was observed after the break-out, a seal portion was completely sound, but tape-shaped secondary formed products derived from graphite were formed. It can be inferred that the secondary formed products (shavings) were clogged, and caused seizure in the thread. The tape-shaped objects (shavings) were formed at the time of make-up, for example, in voids between valleys of the box connection and threads of the pin connection at positions opposite to the valleys. The objects (shavings) were also formed in voids between stabbing flanks and voids between load flanks. "Fluidity" of the tape-shaped objects is poor, that is, the tape-shaped objects could not move in conjunction with a tightening speed and accumulated in some of the voids. It is inferred that they directly caused seizure or damaged the solid lubricating coating film, and thus created a cause of seizure in the subsequent make-up/break-out. Observed was a state in which some of these tape-shaped objects were reversely rotated by break-out, thus partially broken, and changed to powdery-shaped objects.

Although this is an example, it is inferred that, when the solid lubricant is only graphite, blended with the binder resin, and then formed into a film, almost the state as described above is established in almost all cases regardless of which binder resin is selected.

As described above, the inventors have found that, even in cases where the graphite clearly described as having an effect in the past literatures is actually applied and simulated, seizure occurred in almost all the cases. This is inevitably said to be quite incomprehensible. In the case where only graphite was used as the solid lubricant, more or less, tape-shaped secondary products derived from graphite were formed in one make-up/break-out, and clogged. In addition, the clogged products further become powdery to close the thread gap, and seizure occurs at the thread. Alternatively, seizure is likely to occur at the second and subsequent make-up/break-out, due to damage. Then, the inventor has found that, when the solid lubricant is completely formed of graphite, tape-shaped secondary products derived from graphite are strongly formed, which are clogged in the thread gap and become a main cause of seizure.

As described above, the present inventors have found that graphite is conventionally recognized as a solid lubricant according to common knowledge, but cannot be applied as it is in the field of connections for oil country tubular goods. That is, there is a problem that seizure cannot be suppressed unless graphite is fully used after an appropriate range of graphite is determined.

Then, it is necessary to clarify an optimum scope in which the effect of improving lubrication by graphite can be expected to achieve lubrication. Furthermore, it is necessary to appropriately select a combination of binder resins. However, none of the past literatures clearly indicates an appropriate combination of binder resins.

In addition, there is a problem that, since lubrication of the connection for oil country tubular goods is different from other lubrication behaviors, it is not possible to apply definition obtained by evaluation based on other lubrication conditions.

In general, as the lubrication behavior between two objects that rub against each other, a situation is assumed in which one object is fixed and the other object moves. In addition, for a moving object, it is assumed that lubrication starts from a state in which the moving object is closely adhered to the fixed object. Even in a case where both objects move, lubrication usually starts from a state in which they are stuck together.

On the other hand, the lubrication of the connection for oil country tubular goods starts from a state in which the pin connection (male thread) is rattled with respect to the box connection (female thread) by allowance of the connection at an initial stage of make-up. Therefore, the threads are not always in stable contact with each other until the threads are engaged with each other to some extent. That is, in the lubrication of the connection for oil country tubular goods, the case where the threads strongly contact and the case where the threads hardly contact are unevenly distributed. In addition, there is a high concern that the lubricating coating film will be damaged when the threads strongly contact. Further, in the lubrication after the threads are engaged with each other, they slide under the influence of the lubrication situation in the place.

In particular, in a situation where there is "backlash" until the threads are engaged with each other, in the case of the solid lubricating coating film, there is a problem that the solid lubricating coating film is directly affected by an unbalanced load derived from the backlash, and the solid lubricating coating film is easily damaged.

In addition, in an actual well, there is an influence due to application of a total weight of the pin connection to the box connection at the time of make-up/break-out. In addition, due to the presence of backlash as described above, the load is not uniformly applied, and the pin tends to eccentrically rotate until the threads are engaged with each other. For this reason, the solid lubricating coating film needs to be a film in which lubrication withstands a large load applied as an unbalanced load. A film which may be completely removed or almost completely broken and disappear cannot deal with such a large load. In an actual well, the oil country tubular goods is mostly used with a length of Range-3 or Range-2 in the API-5CT standard. In the former standard, the oil country tubular goods is often operated at about 12 to 16 m. For example, an oil country tubular goods of about 12 m (about 40 feet) in length would have a self-weight of about 1 t load at an outer diameter of 9⅝". In marine rigs, three pin connections connected to each other in advance are often made up and used. Therefore, when an oil country tubular goods having an outer diameter of 9⅝" is used, there is a severe situation in which a load of about 3 tons is applied to the box side.

In the lubrication of the connection for oil country tubular goods, it is necessary to assume lubrication that withstands such a large load and an unbalanced load. As a result of various studies, the inventor has found that what is important is to devise a solid lubricant and a binder resin in consideration of how to suppress damage to a solid lubricating coating film in a situation where there is "backlash" until threads are engaged with each other under a large load.

On the other hand, it is difficult to say that the solid lubricating coating film is designed based on such a viewpoint in the past literatures.

The example indicated above is a result of a test with a horizontal tong in which no large load is applied because a short pin is used. Therefore, a problem occurs which is not even as to whether evaluation is performed with materials close to those applied under actual well conditions. Thus, it is indicated that use of only graphite as the solid lubricant cannot be expected to provide an improvement effect at all as described in the past literatures.

As described above, the solid lubricant completely formed of graphite cannot be applied, and it is necessary to reconsider the solid lubricant, and also to optimize a component composition of the solid lubricant. In addition, it is necessary to study the binder resin.

In addition, it is necessary to consider anticorrosion property simultaneously with use of lubrication of the connection for oil country tubular goods. A material for the oil country tubular goods may be placed and stored in a yard for a long period of time, e.g., about one to two years, and thus needs to be a film that resists corrosion even in a rainy situation.

The present invention has been made in view of the above points, and an object of the present invention is to provide a solid lubricating coating film capable of imparting favorable lubricity and corrosion resistance to a connection for oil country tubular goods even when graphite is employed as a solid lubricant.

Solution to Problem

The present disclosure provides a solid lubricating coating film and an agent including graphite as a main component of a solid lubricant and a PEEK resin as a main component of a binder resin. Further, there is clarified an appropriate range in which stable lubrication and corrosion resistance can be achieved at the same time under severe conditions where a large load is applied and an unbalanced load is also applied, such as make-up/break-out of a threaded joint for oil country tubular goods. As a result, the present disclosure ensures lubricity enough to withstand make-up/break-out in an actual well, and, at the same time, achieves corrosion resistance.

As described above, when a solid lubricating coating film is formed simply using graphite as a solid lubricant, in many cases, the solid lubricating coating film is damaged during make-up/break-out. In addition, when graphite is simply used, peeled graphite is pressed against a thread surface in conjunction with make-up/break-out. Conventionally, this causes secondary products having a black tape shape. Then, the inventor has found that seizure frequently occurs due to clogging of the products in a gap between threads.

Then, the inventor has found that, when the solid lubricant is completely formed of graphite, tape-shaped secondary products derived from graphite are strongly formed, which are clogged in the thread gap and become a main cause of seizure. In addition, the present inventor has found that, while graphite having a specific shape (scaly) is used as a main component, specific other solid lubricants are added, and thus that firm production of tape-shaped secondary products derived from graphite can be inhibited.

In view of this fact, the present inventor has reviewed a range of conditions for improvement and modification, and has found an optimum range of graphite, an optimum range of the binder resin, and an optimum ratio including a blending ratio between the graphite and the binder resin. For example, seizure frequently occurs only by "mere use of graphite" as described in the past literatures. Stable lubrication is not achieved simply by introducing graphite. The inventor has found that, in order to lead to improvement in lubrication, it is important to optimize graphite and to control hardness by using PEEK as a main component of the binder resin.

In addition, as described above, if graphite-based black tape-shaped secondary products are strongly formed, the products are clogged in the thread gap, which directly leads to seizure. Therefore, the present inventor has found that it is necessary to select graphite by selecting the type, blending ratio, and particle size of graphite and excluding a range of graphite that causes seizure.

The selection of the binder resin is also important. As described above, the lubrication of the connection for oil country tubular goods is exposed to severe conditions that a large load and an unbalanced load are applied until the threads are sufficiently engaged with each other. At that time, the solid lubricating coating film cannot be said to have no damage, and is easily peeled from hardness and a contact surface. The black tape-shaped secondary products are peeled at the time of make-up/break-out, and comes out into the thread gap. The present inventor has found that this is derived from graphite and the binder resin, and thus that it is necessary to regulate the above-described definition of graphite and also the binder resin to reduce the amount of the black tape-shaped secondary products, and also to form not black tape-shaped products, but powdery to smaller lump products, even when graphite and the binder resin are peeled off, so that they move in conjunction with make-up/break-out to prevent them from closing a specific portion and causing seizure.

As a result of reviews by the inventor, it has been found that the following ranges of graphite and the binder resin are remarkably excellent. It is important to prevent use of 100% graphite as the solid lubricant and to mix another type of solid lubricant, although a certain amount of graphite as the solid lubricant is secured. Specifically, it is important to adjust a content of graphite to 50 to 90%. Furthermore, as graphite itself, it is important to select scaly graphite and graphite having a small average particle diameter of 0.1 to 10.0 μm. At the same time, it is important to select a PEEK resin as a main component of the binder resin, to adjust a content of the PEEK resin to 70% or more, and to select a PEEK resin having an average particle size of 20 μm or less. In addition, it has been found to be important to suppress a weight balance of graphite within an appropriate range of 20% or more and 50% or less with respect to all coating film components (=total weight of solid lubricant+total weight of binder resin).

By virtue of these regulations, the "black tape-shaped secondary products" formed on the basis of graphite and the binder resin, which is inevitably scraped off (peeled off) under load conditions based on a large load and an unbalanced load in a make-up/break-out step, which is the main cause of seizure. In addition, the purpose of these regulations are intended to change the shape of secondary products to a powdery to smaller shape, not a black tape shape, so as to be able to move in conjunction with make-up/break-out, and avoid them from accumulating at a certain place and causing seizure. At the same time, these regulations are made in order to be able to ensure also corrosion resistance.

Other conditions for the optimum ranges include conditions obtained by reviewing blending regulations of solvents, regulations of solid lubricants other than graphite, regulations of pencil hardness and film thickness of the solid lubricating coating film, a base layer of the solid lubricating coating film, and the like. Then, the invention is constructed as follows, including an agent for forming the solid lubricating coating film, a coating film itself, and a threaded joint for oil country tubular goods formed with the solid lubricating coating film, as well as a metal material formed with the solid lubricating coating film and a film formation method, as extensions of the invention.

An aspect of the present invention is an agent for forming a solid lubricating coating film in a thread portion of an oil country tubular goods, in which two or more types of solid lubricants dispersed in a binder resin, graphite is contained, as one of the two or more types of solid lubricants, in an amount of 50% or more and 90% or less of a total weight of the solid lubricants, the graphite having a scaly shape and an average particle diameter of 10.0 μm or less, a solid lubricant made of one or more materials selected from BN (boron nitride), mica, talc, MCA (melamine cyanurate), $MoS_2$ (molybdenum disulfide), PTFE (polytetrafluoroethylene), PFA (perfluoroalkoxyalkane; tetrafluoroethylene-perfluoroalkoxyethylene copolymer resin), and FEP (perfluoroethylene propene copolymer; tetrafluoroethylene-hexafluoropropylene copolymer) is further contained as other solid lubricants of the two or more types of solid lubricants, and the binder resin contains a PEEK resin having an average particle diameter of 20 μm or less as a main component, the PEEK resin being contained in an amount of 70% or more of a total weight of the binder resin.

Another aspect of the present invention is an oil country tubular goods including a lubricating coating film including a solid lubricating coating film, the lubricating coating film being formed in a thread portion, wherein the solid lubricating coating film is formed by dispersing a solid lubricant in a binder resin, graphite is contained, as one of the two or more types of solid lubricants, in an amount of 508 or more and 90% or less of a total weight of the solid lubricants, the graphite having a scaly shape and an average particle diameter of 10.0 μm or less, a solid lubricant made of one or more materials selected from BN (boron nitride), mica, talc, MCA (melamine cyanurate), $MoS_2$ (molybdenum disulfide), PTFE (polytetrafluoroethylene), PFA (perfluoroalkoxyalkane; tetrafluoroethylene-perfluoroalkoxyethylene copolymer resin), and FEP (perfluoroethylene propene copolymer; tetrafluoroethylene-hexafluoropropylene copolymer) is further contained as other solid lubricants of the two or more types of solid lubricants, and the binder resin contains a PEEK resin having an average particle diameter of 20 μm or less as a main component, the PEEK resin being contained in an amount of 70% or more of a total weight of the binder resin.

Advantageous Effects of Invention

The aspects of the present invention can provide a solid lubricating coating film capable of imparting favorable lubricity and corrosion resistance to an oil country tubular goods thread portion even when graphite is employed as a solid lubricant.

For example, according to the aspects of the present invention, a threaded joint for oil country tubular goods having lubricating performance and corrosion resistance during make-up is obtained that takes into account actual well equivalent conditions as may occur in an actual well environment. Note that the actual well equivalent conditions are, for example, situations in which a pin weight is applied to the box from above, a load is applied obliquely due to shaft misalignment, or a load is applied locally rather than uniformly in many cases.

BRIEF DESCRIPTION OF DRAWINGS

FIG. 1 is a view illustrating an oil country tubular goods and a threaded joint for oil country tubular goods;

DESCRIPTION OF EMBODIMENTS

Next, embodiments of the present invention will be described with reference to the drawings.

Figure 2A:
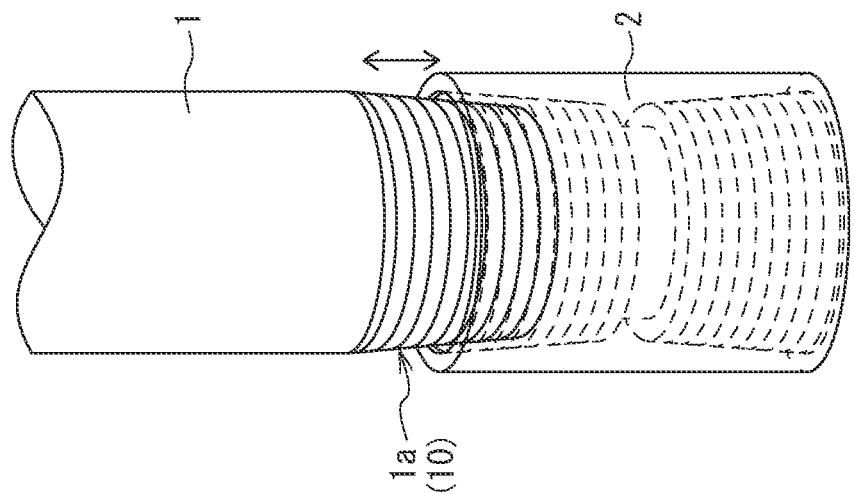
FIG. 2A is a chart diagram of make-up in an actual well.
Figure 2B:
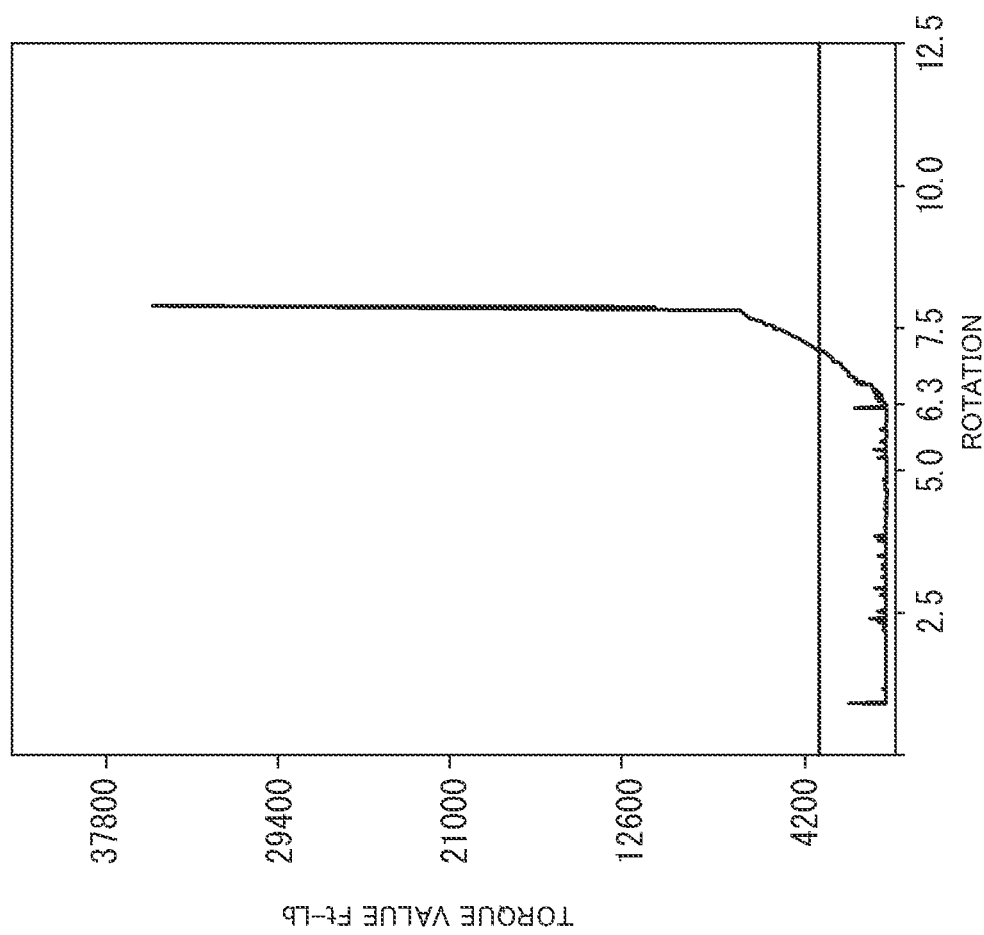
FIG. 2B is a diagram illustrating an initial set position at that time.

Here, as a result of repeated studies by the inventor, it has been found to be necessary to divide make-up/break-out with a solid lubricating coating film into two phases, and to consider situations occurring in each phase.
<FIGS. 2A and 2B>

FIG. 2A is an example at the time of make-up in an actual well.

FIG. 2A is a torque turn chart (make-up chart) when a make-up test is performed under the condition that a pin having an actual length of 40 feet (=12 m) is used as a simulation of the actual well. In an actual oil field/gas field, make-up is often started from a situation where the threads are not sufficiently engaged with each other. In view of this situation, FIG. 2A illustrates an example in which make-up is started from a state in which the pin connection is exposed from the box connection by about half at the time of starting initial make-up as illustrated in FIG. 2B. A 9⅝" 53.5 #Q125 JFELION (trademark) connection was used as the pin, and a pin having a length of about 40 feet or more was used from the viewpoint of simulating the actual well.

FIG. 2A is a chart when the pin is made up with a vertical tong while being hung with a crane of a type in which the entire length of the pin is hung from above a rig.

FIG. 2A can be regarded as illustrating a situation that often occurs in an actual well.

It should be noted, in FIG. 2A, that before a point at which the torque continuously increases, that is, in phase 1 at which a rotation speed in FIG. 2A is 6.3 rotations or less, the torque should not be generated in principle. However, actually, in phase 1, a spike-like torque tends to be generated frequently in a non-regular manner.

This suggests that the pin connection is contacting the box connection irregularly and locally with respect to the box connection while rotating. This is a situation that occurs during the make-up in the actual well.

It is meant that, in phase 1, the solid lubricating coating film is inevitably broken and peeled off to some extent depending on the design and optimization of the solid lubricating coating film. What should be emphasized here is that the state of FIG. 2A is not the worst state created intentionally, but rather is merely a torque turn chart for a sample with a solid lubricating coating film.

Figure 3B:
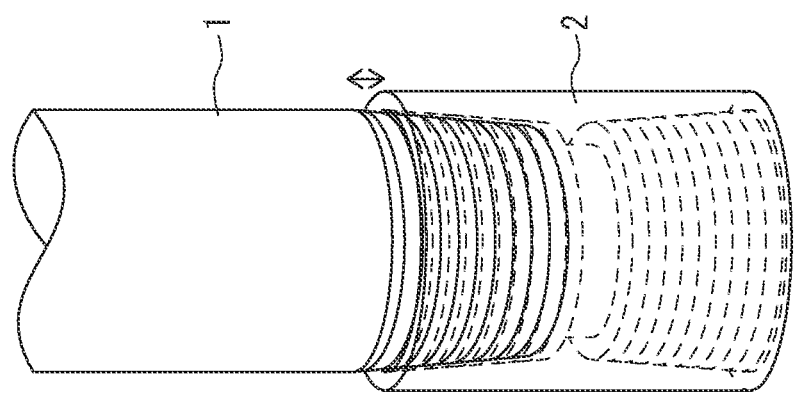
FIG. 3B is a diagram illustrating an initial set position at that time.
Figure 3A:
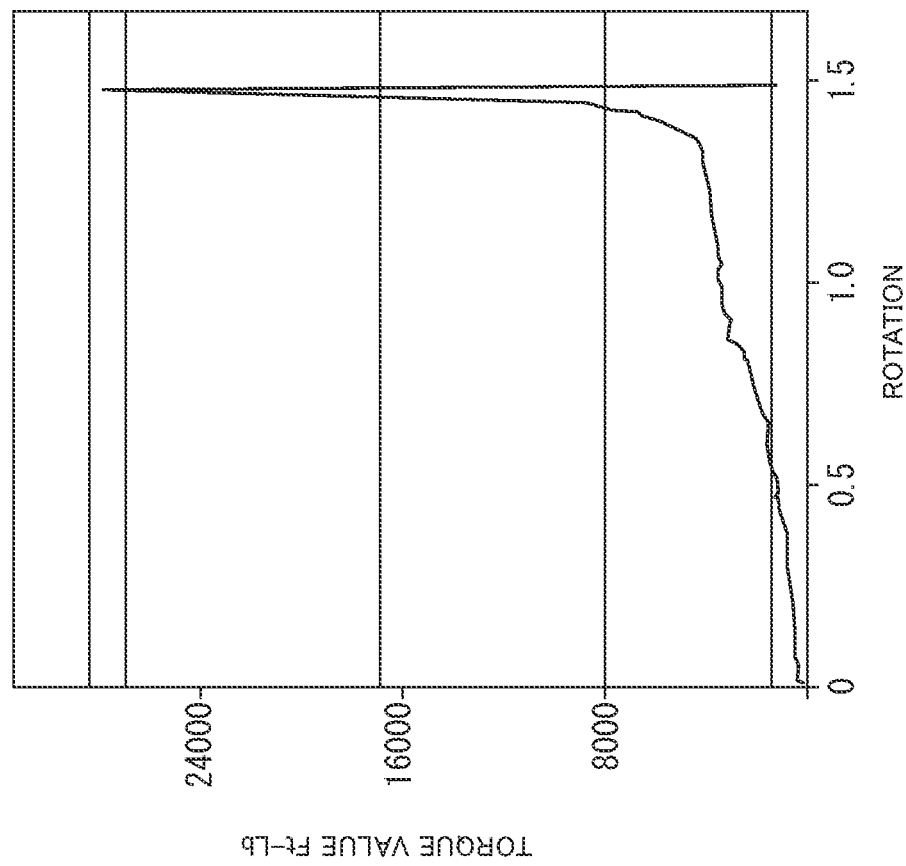
FIG. 3A is a chart diagram of make-up in a conventional laboratory test.

<FIGS. 3A and 3B>

On the other hand, FIG. 3A is a torque turn chart in a case where the same solid lubricating coating film as in FIGS. 2A and 2B is used and make-up is performed with a vertical power tong.

The pin used in FIGS. 3A and 3B has the same outer diameter, thickness, and connection type as the pin in FIGS. 2A and 2B, but is a short pin having a length of about 1 m.

FIG. 3A is a make-up chart (torque turn chart) when make-up is started from a state where the threads are sufficiently engaged with each other. That is, as illustrated in FIG. 3B, FIG. 3A is a make-up chart (torque turn chart) in a case where the number of pin threads exposed are about 1 to 3 at the start of initial make-up.

The conditions of FIG. 3A are also conditions often used at the time of make-up in a conventional laboratory test, and the case of FIG. 3A is a case where the connection is set until the threads are engaged by tightening by hand.

In FIG. 3A, it is necessary to pay attention to the fact that the unit on the horizontal axis is different from that in FIG. 2A.

In FIG. 3A, make-up with the tong is started from the state where tightening by hand is performed until a state where the threads are engaged with each other, and thus, no spike-like torque as seen in FIG. 2A is observed.

As can be seen from FIGS. 3A and 3B, in the conventional laboratory test, in phase 1, the solid lubricating coating film is not broken, and make-up occurs from a region where both thread surfaces start to contact.

Figure 4A:
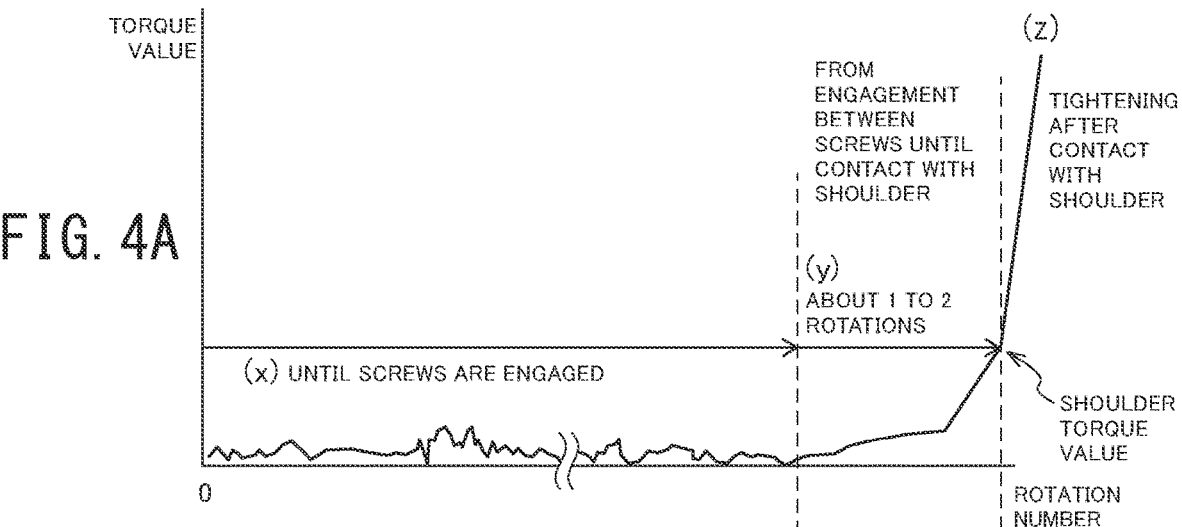
FIG. 4A is a schematic chart diagram of make-up in the case of the actual well.
Figure 4B:
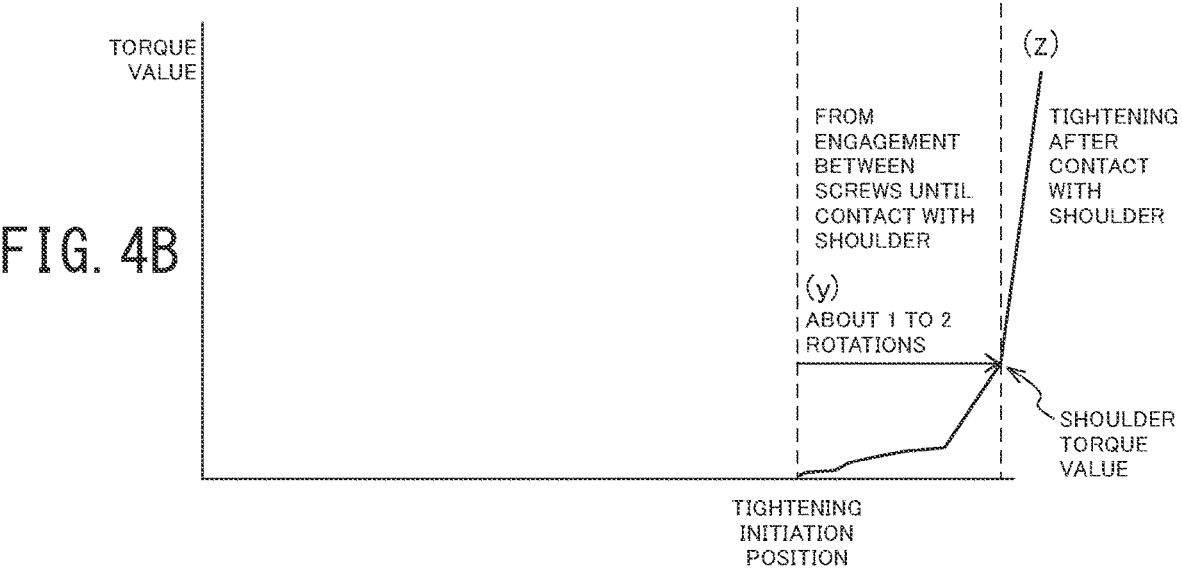
FIG. 4B is a schematic chart diagram of make-up in the case of the conventional laboratory test.

<FIGS. 4A and 4B>

FIGS. 4A and 4B illustrate FIGS. 2A and 3A in an easily comparable state.

FIG. 4A illustrates the example of FIGS. 2A and 2B, and FIG. 4B illustrates the example of FIGS. 3A and 3B.

According to the review of the inventor, considering the use in the actual well, it is preferable that an ideal solid lubricating coating film is not broken in a region (x) in FIG. 4A, and that concerns about breakage and peeling are minimized. Alternatively, it is preferable to design the secondary products derived from the solid lubricating coating film broken or peeled off so as not to be clogged in the thread gap in the make-up/break-out process but, conversely, to be successfully attached to the connection and assist lubrication, although the spike may be somewhat standing (situation in which the solid lubricating coating film is damaged).

Here, it is considered that many past literatures are directed to lubrication (FIG. 4B and FIG. 3A) after the connection is engaged, as determined from make-up/break-out test results. It is considered that many past literatures are directed to lubrication after the threads are engaged with each other, that is, superiority/inferiority of lubrication characteristics of the solid lubricating coating film itself. For this reason, it is inferred that a short pin is used, that a horizontal tong and a vertical tong are used to set up to a portion where the connection is tightened by hand, and then that break-out is performed. Note that, some of the patent literatures clearly indicating the number of times of make-up/break-out describe that make-up can be performed 10 times in the case of a small diameter size in an actual well. However, this number of times appears to be possible both in the evaluation with a short pin and in the evaluation in an actual well. On the other hand, in the case of a large diameter size of 9⅝" or 13⅜", there are some indications that make-up/break-out based on a solid lubricating coating film can be performed up to 15 to 20 times. However, this number of times of make-up/break-out is almost impossible in the case of a large diameter with a solid lubricating coating film in an actual well.

In addition, a large-diameter connection for oil country tubular goods generally has a higher tightening torque value, and has more allowance (backlash) between the box connection and the pin connection. Accordingly, the solid lubricating coating film is inevitably broken and peeled off to some extent before the threads are sufficiently engaged with each other. In addition, at the beginning of the test, at a stage where the pin connection is set to the box connection, handling is difficult due to heavy weight, and the pin connection is carelessly brought into contact with the box connection at a certain frequency. This also causes the solid lubricating coating film to be broken and peeled off.

In the present embodiment, the actual make-up/break-out situation in an actual well has been considered. Furthermore, in view of the fact that seizure frequently occurs in practice when graphite, which is described in many documents as favorable for lubrication, is used, reviews have been made in the present disclosure in order to achieve maximum utilization of lubrication using graphite under actual well conditions.

(Configuration)

The present embodiment relates to a coating film structure formed on a tightening surface in a connection for oil country tubular goods used for actual oil/gas, and a threaded joint having the coating film structure as a lubricating coating film. The present embodiment is characterized by the lubricating coating film including the solid lubricating coating film formed on the tightening surface of the threaded joint, and the connection structure itself of the threaded joint is not particularly limited. A known or novel connection structure may be adopted as the connection structure of the threaded joint.

<Oil Country Tubular Goods and Threaded Joint for Oil Country Tubular Goods>

The oil country tubular goods includes, for example, a box 2 such as a coupling and a pin 1 as illustrated in FIG. 1.

As illustrated in FIG. 1, the threaded joint for oil country tubular goods includes a box 2, such as a coupling having a female thread 2a, and a pin 1 having a male thread 1a. A lubricating coating film including a solid lubricating coating film is formed on a contact surface (tightening surface 10) of the thread portion in at least one component of the box 2 and the pin 1.

<Agent for Forming Solid Lubricating Coating Film>

Hereinafter, an agent for forming a solid lubricating coating film in the present embodiment will be described.

The agent of the present embodiment is formed by dispersing two or more types of solid lubricants in a binder resin as a matrix component.

In the present embodiment, graphite is contained as one of the two or more types of solid lubricants in an amount of 50% or more and 90% or less of the total weight of the solid lubricants. The graphite has a scaly shape and an average particle diameter of 10.0 µm or less. Here, in the present embodiment, the scaly shape means that the best crystallinity and the highest black lead purity are preferable.

Furthermore, as other solid lubricants of the two or more types of solid lubricants, a solid lubricant formed of one or more materials selected from the following first group of solid lubricant materials and the following second group of solid lubricant materials is contained.

[First Group of Solid Lubricant Materials]
  BN (boron nitride)
  Mica (mica)
  Talc
  MCA (melamine cyanurate)
  $MoS_2$ (molybdenum disulfide)

[Second Group of Solid Lubricant Materials]
  PTFE (polytetrafluoroethylene)
  PFA (perfluoroalkoxyalkane; tetrafluoroethylene-perfluoroalkoxyethylene copolymer resin),
  FEP (perfluoroethylene propene copolymer; tetrafluoroethylene-hexafluoropropylene copolymer)

The first group of solid lubricant materials and the second group of solid lubricant materials are different in lubrication mechanism.

The first group of solid lubricant materials are lubricants in which two-dimensional layered compounds are bonded in a 2 direction by an intermolecular force, and when a force is applied in a lubrication direction, two-dimensional strong molecular structures slide to realize lubrication. The second group of solid lubricant materials are lubricants in which strongly formed molecules having a one-dimensional linear structure are bonded to each other by intermolecular force, and, when a force is applied in the lubrication direction, the molecules slide with each other for each linear structural unit in a one-dimensional direction to realize lubrication.

The reason for mixing materials selected from the first group of solid lubricant materials and the second group of solid lubricant materials is as follows. When lubricant is established using graphite singly, secondary "black tape-shaped secondary products" are produced, which are formed of scraped black lead and scraped PEEK resin together, in the case of lubrication in a connection for oil country tubular goods. In addition, this may be formed too strongly. For this reason, there is a possibility that the "black tape-shaped secondary products" are clogged in a gap between the threads and causes seizure. In view of this, in the present embodiment, by mixing a solid lubricant different from graphite, the secondary products to be produced is reduced, and the seizure risk is reduced while high lubrication is maintained.

Here, it is preferable to incorporate at least PTFE as the other solid lubricants. This is because PTFE itself is a solid lubricant that can be expected to provide high lubrication as well as a solid lubricant based on a mechanism different from that of black lead.

An average particle diameter of the other solid lubricants is preferably in a range of 0.1 μm or more and 5 μm or less.

In the present embodiment, the binder resin contains a PEEK resin having an average particle diameter of 20 μm or less as a main component, and the PEEK resin is contained in an amount of 70% or more of the total weight of the binder resin.

The total weight of the solid lubricants is preferably 0.1 times or more and 2 times or less the total weight of the binder resin.

A content of graphite as the solid lubricant is preferably 20% or more and 50% or less of a sum of the total weight of the solid lubricants and the total weight of the binder resin.

The agent contains a solvent for adjusting drying property and liquid viscosity such that the solvent does not remain in the coating film. A weight ratio of the solvent is preferably 30% or more and 80% with respect to a weight of the sum of the total weight of the solid lubricants and the total weight of the binder resin.

<Coating Film Structure of Connection for Oil Country Tubular Goods>

Hereinafter, a coating film structure of the connection for oil country tubular goods in the present embodiment will be described.

A lubricating coating film including a solid lubricating coating film is formed on a tightening surface of the thread portion in at least one component of the box and the pin.

The solid lubricating coating film is formed by dispersing the solid lubricants in the binder resin as the matrix component.

In the present embodiment, graphite is contained as one of the two or more types of solid lubricants in an amount of 50% or more and 90% or less of the total weight of the solid lubricants. The graphite has a scaly shape and an average particle diameter of 10.0 μm or less. Here, in the present embodiment, the scaly shape means that the best crystallinity and the highest black lead purity are preferable.

Furthermore, as other solid lubricants of the two or more types of solid lubricants, a solid lubricant formed of one or more materials selected from the above first group of solid lubricant materials and the above second group of solid lubricant materials is contained.

Here, it is preferable to incorporate at least PTFE as the other solid lubricants.

An average particle diameter of the other solid lubricants is preferably in a range of 0.1 μm or more and 5 μm or less.

In the present embodiment, the binder resin contains a PEEK resin having an average particle diameter of 20 μm or less as a main component, and the PEEK resin is contained in an amount of 70% or more of the total weight of the binder resin.

The total weight of the solid lubricants is preferably 0.1 times or more and 2 times or less the total weight of the binder resin.

A content of graphite as the solid lubricant is preferably 20% or more and 50% or less of a sum of the total weight of the solid lubricants and the total weight of the binder resin.

The solid lubricating coating film includes, for example, a thread of the thread portion and is formed up to a region adjacent to the thread.

The solid lubricating coating film preferably has a hardness of 3H or more as pencil hardness.

The solid lubricating coating film preferably has a film thickness of 10 μm or more and 150 μm or less.

Figure 7A:
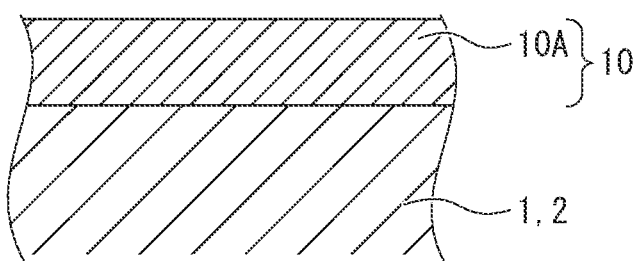
FIGS. 7A and 7B are views illustrating a coating film structure.
Figure 7B:
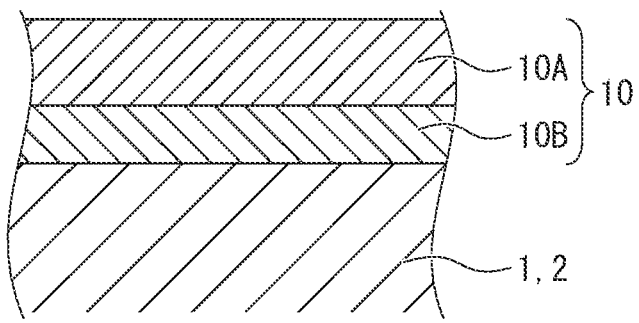

When the materials for the box and the pin are each carbon steel or low alloy steel, the lubricating coating film may have a base layer 10B between the tightening surface of the thread portion and a solid lubricating coating film 10A (see FIGS. 7A and 7B). The base layer 10B is formed of, for example, an electroplating film or a chemical conversion-treated film.

When the materials for the box and the pin are each a stainless steel material, a Ni-based alloy, or a Ti alloy, the lubricating coating film may have the base layer 10B between the tightening surface of the thread portion and the solid lubricating coating film. The base layer 10B is formed of, for example, an electroplating film.

The threaded joint for oil country tubular goods may have a structure in which a lubricating coating film including the solid lubricating coating film is formed on the tightening surface of the thread portion in one component of the box and the pin, and a film softer than the solid lubricating coating film is formed on a tightening surface of a thread portion of the other component of the box and the pin. The softer film is also preferably a solid lubricating coating film.

<Black Tape-Shaped Secondary Product>

As described above, when graphite is selected as the solid lubricant, generation of "black tape-shaped secondary products" is often observed.

In the field of lubrication of connection for oil country tubular goods, when graphite is used as the main component of the solid lubricant, a main cause of seizure is "black tape-shaped secondary products". The "black tape-shaped secondary products" are secondarily formed based on the solid resin coating film components (solid lubricant+binder resin component) inevitably scraped off in the make-up/break-out step. It has been found that the products are clogged in a slight gap between the threads, which causes seizure. In the case of lubrication of the connection structure, metals are completely closely adhered to each other due to the connection structure. Exactly, from a situation where there is a very thin gap to a situation where there is a slight gap occur, but, in any case, there is a void between the facing contact surfaces of the threads. When the connection is made up and broken out, the lubricant moves smoothly and seamlessly in conjunction with the movement of the threads, which is the basis for maintaining low friction, that is, high lubrication.

The same mechanism applies to the case of lubricating coating film which is not a solid lubricating coating film. For example, in the case of a general-purpose grease-like compound, a key is that the compound is uniformly applied before make-up so as not to run out of oil, and, at the same time, the compound moves following the make-up/break-out of the threads. Even in the case of this compound, when the compound is clogged at one place of the thread gap, which causes seizure. However, the compound is a viscous liquid, and tends to move along this gap. On the other hand, when graphite is used as the main component of the solid lubricant, graphite is a sheet-shaped layered material, and layers are weakly bonded to each other by intermolecular force. For this reason, graphite peels in layers when receiving a large force from a certain direction, and realizes low friction (=high lubrication) on the spot. As described above, since graphite has a strong sheet-shaped structure due to its physical structure, graphites are inevitably connected to each other and tend to be in a tape shape. Further, there is a strong tendency that an organic resin constituting the binder resin acts like a kind of paste, and that firm and thick black tapes are formed just so as to fill the threads and the roots. Therefore, the solid lubricating coating film inevitably scrapes itself off to some extent during make-up/break-out of the threads. The peeled solid lubricating coating film (shaving) forms a black tape-shaped secondary product as described above. Moreover, the layers are stacked weakly at an intermolecular force level, and move in a slippery direction due to a load applied at the time of make-up/break-out. However, the two-dimensional planar sheet-shaped structure itself is extremely strong, and is not so much broken at a load level applied at the time of make-up/break-out. Therefore, the black tape-shaped secondary products continue to gradually increase in thickness, and have no mobility to move in conjunction with make-up/break-out. Also, in practice, the make-up/break-out of the threads cannot be performed homogeneously or bilaterally symmetrically. In the initial stage of make-up and a final stage of break-out, make-up/break-out is performed eccentrically to some extent in most cases. Therefore, in the solid lubrication using graphite, it is important to take a measure of not making a black tape-shaped object derived from graphite, or, if the objects are produced, reducing the number of objects, or to make it easy to form not a strong tape-shaped object, but an easy-to-break or powdery object for easy movement in conjunction with make-up/break-out.

In the present embodiment, in order to realize this, reviews have been made to set regulation of each material.

Hereinafter, the regulation of each material will be further described.

<Main Component of Solid Lubricant>

As described above, in the present embodiment, two or more types of solid lubricants are used while graphite is used as the main component.

Graphite is contained as one of the two or more types of solid lubricants in an amount of 50% or more and 90% or less of the total weight of the solid lubricants. The graphite has a scaly shape and an average particle diameter of 10.0 μm or less.

Furthermore, as other solid lubricants of the two or more types of solid lubricants, a solid lubricant formed of one or more materials selected from the above first group of solid lubricant materials and the above second group of solid lubricant materials is contained.

The present embodiment is directed to improvement in the field of lubrication of connection for oil country tubular goods by utilizing graphite which is said to be a highly lubricated material, and its application field. There are many application cases in other fields. However, in the field of lubrication of connection for oil country tubular goods and its similar fields, when only graphite is selected as the solid lubricant, seizure frequently occurs, as described in the past literatures.

On the other hand, in the present embodiment, upper and lower limits of a content of each solid lubricant are set from the viewpoint of avoiding the "black tape-shaped secondary products" derived from graphite described above, that is, from the viewpoint of not producing the black tape-shaped secondary products or, if the products are produced, reducing the amount of the products. In addition, the upper and lower limits of the content of each solid lubricant are set from the viewpoint of forming not strong tape-shaped products, but divided/cut products.

The reason why the lower limit on the graphite amount is set to 50% as the material forming the solid lubricant is that the lower limit is set as the minimum amount necessary for obtaining the lubrication improving effect by graphite. If it is less than 50%, the improvement in lubrication is not observed or is slight.

The reason why the upper limit is set to 90% is that, if the upper limit exceeds 90%, there is a high concern that the tape-shaped secondary products derived from graphite are clogged in the thread gaps and cause seizure.

Here, it is important in the present disclosure to make the tape-shaped secondary products derived from graphite fragile while using graphite as the main component of the solid lubricant. In addition, it is important to prevent a thick and strong tape-shaped products from being formed. Producing tape-shaped secondary products divided as short as possible or in a powdery state is an important point in improving lubrication when graphite is used as the main component of the solid lubricant.

Therefore, one of the characteristics of the present disclosure is to mix another type of solid lubricant with graphite to form a solid lubricating coating film. In the case of a solid lubricant other than graphite, even if $MoS_2$, BN or the like of the layered solid lubricant is mixed as an accessory component, the property of the strong (long) tape-shaped secondary products can be changed to shorten the length of the tape-shaped secondary products or to form the tape-shaped secondary products into a powdery shape. As a result, the products derived from graphite can be avoided from being clogged in the gap between the pin connection and the box connection and causing seizure. In particular, by mixing a type of solid lubricant that is not layered solid lubricant, for example, PTFE, as another type of solid lubricant, the secondary products can be formed in a powdery shape or into a tape shape that is easily broken.

In the present embodiment, scaly graphite was selected as the type of graphite. Natural graphite-based black lead such as earthy black lead and expanded black lead, and artificial black lead were not selected. The reason why the scaly shape was selected is that graphitization is most advanced, that is, networking of carbon having a two-dimensional layer structure and a form in which the layers are bonded by intermolecular force are advantageous for lubrication.

Black lead having a particle size of 0.1 to 10.0 µm was selected as the particle size of graphite. This is because, in order to effectively utilize the lubrication of graphite, if the size exceeds 10 µm, the graphite itself is too large, and the black lead itself causes seizure. There is no particular lower limit, but the graphite size includes up to the minimum size of black lead. For example, the lower limit is considered to be 0.1 µm.

<Secondary Component of Solid Lubricant>

The main component of the solid lubricant of the solid lubricating coating film is graphite that accounts for 50% or more and 90% or less of the solid lubricant, and the main component of the binder resin is a PEEK resin.

In the present embodiment, the solid lubricant, in a broad sense, also includes an additive other than the binder resin component.

The solid lubricating component to be secondarily mixed is a solid lubricant including one or more types of materials selected from the first group of solid lubricant materials and the second group of solid lubricant materials.

Here, black lead has a strong structure in a two-dimensional plane and is in a state of being weakly bonded together in layers by intermolecular force, and, when force is applied, black lead slides as if a mountain of stacked playing cards slides, and thus maintains lubrication while keeping a two-dimensional strong molecular structure. When black lead is randomly used, "black tape-shaped secondary products" are often produced, which are clogged in the thread gap and cause seizure. This phenomenon has to be avoided through optimization of black lead and optimization of the PEEK resin. From such a viewpoint, it is preferable to select secondary components along the main structure of the present disclosure.

That is, the solid lubricating component secondarily mixed is preferably a lubricating additive having a mechanism in which long chain molecular chains slide in a direction in which a force is applied to each other, rather than a lubricant utilizing sliding on a two-dimensional face, which is based on the same mechanism as black lead.

From such a viewpoint, it is preferable to use, for example, PTFE as the solid lubricating component to be mixed secondarily. The condition is defined as a suitable condition at this time, and an average particle size of 0.1 to 5 µm is defined as favorable. If the average particle size is more than 5 µm, PTFE itself is entangled, and the effect of improving lubrication is small. If the average particle size is less than 0.1 µm, when PTFE is contained as a secondary component in the component mainly containing graphite, the effect of lubrication of PTFE is buried, and it does not appear that particularly excellent lubrication is exhibited.

For other secondarily mixed solid lubricating components, for example, the average particle diameter is preferably 0.1 to 5 µm.

In addition, PFA and FEP are examples having the same mechanism. These are structures in which side chains are attached to the molecular structure of PTFE, and lubricity is achieved based on sliding of the molecular chains. However, PTFE was selected as a material in a suitable range because PTFE has a side chain and thus has one excellent feature.

In addition, the solid lubricating component to be secondarily mixed can also be selected from the viewpoint of improving lubrication by hardening the film quality. The present disclosure also encompasses adding glass fiber powder and carbon fiber powder.

<Main Component of Binder Resin and Secondary Component of Binder Resin>

The binder resin is formed of one type or two or more types of resin components. The binder resin of the present embodiment contains a PEEK resin having an average particle diameter of 20 µm or less as a main component. The PEEK resin is contained in an amount of 70% or more and 100% or less of the total weight of the binder resin.

In the field of lubrication of connection for oil country tubular goods, when graphite is used as the main component of the solid lubricant, a main cause of seizure is the "black tape-shaped secondary product" formed secondarily based on the solid resin coating film components (solid lubricant+binder resin component) inevitably scraped off in the make-up/break-out step.

The amount of the PEEK resin is defined as 70% or more of the total weight of the binder resin in order to harden the solid lubricating coating film itself in the connection for oil country tubular goods lubrication. That is, this is to reduce the amount of the component scraped off from the coating film to reduce the amounts of black lead and binder resin component from which the "black tape-shaped secondary products" are produced.

When the coating film is hard, the amount of the component peeled/scraped off is reduced, which is preferable. However, the PEEK resin (polyetheretherketone) is selected as the main component of the binder resin from the viewpoint of not simply selecting a hard resin but allowing the resin to be blended with graphite without any problem and from the viewpoint of the hardness of the film quality. As a result, use of a mere hard resin is avoided.

Here, examples of the hard resin include polyetherimide (PEI), polyphenylene sulfide (PPS), polyamideimide (PAI), polybenzimidazole (PBI), and a phenol resin (PF). However, these resins are mere hard resins and cannot be used.

For example, polyetherimide (PEI) is an amorphous resin and has poor wear resistance. Therefore, the solid lubricating coating film tends to be scraped off in the connection make-up/break-out step. Polyphenylene sulfide (PPS) has poor toughness, and is poor in usability depending on the use temperature, and promotes seizure. In the case of polyamideimide (PAI), PTFE is used as the main component and graphite is used as a second component without any particular problem, but when graphite is used as the main component, "black tape-shaped secondary products" are inevitably clogged in the thread gap cause seizure. Polybenzimidazole (PBI) is too hard and thus is not suitable for lubricating applications themselves. In the field of oil and gas, a concern is always pointed out that products containing S, including inhibitors, bactericides, and $MoS_2$, will eventually cause generation of $H_2S$ through microbial corrosion.

Therefore, polyphenylene sulfide (PPS) cannot be applied. In connection for oil country tubular goods lubrication, heat is inevitably generated to some extent. The phenol resin (PF) has a heat resistance temperature of about 150° C., and thus has low heat resistance and cannot be used.

However, in the present disclosure in which the PEEK resin accounts for 70% or more of the main component, these materials are secondarily mixed and used, without any particular problem.

The particle size of the PEEK resin must be 20 μm or less. This is because, similarly to graphite, when the particle size of the PEEK resin is too large, the PEEK resin itself causes seizure. At the time of make-up/break-out of the connection for oil country tubular goods, a large load is pressed, and the threads are slid in an environment ranging from that in which the gaps between the threads are narrow to that in which the films are almost closely adhered to each other. Both the binder resin and the solid lubricant are crushed and do not maintain their original sizes. However, when the initial size of the PEEK resin is 20 μm, the resin is highly likely to cause seizure. Therefore, the maximum size of the average particle size of the PEEK resin was defined as 20 μm or less.

<Blending Ratio Between Solid Lubricant and Binder Resin, and Blending Proportion of Graphite>

In the coating film state, the weight of the solid lubricant contained in the film is 0.1 times or more and 2 times or less the weight of the binder resin. A weight fraction of graphite is defined as 20% or more and 50% or less. This regulation was also established in order to minimize the "black tape-shaped secondary products" described above and to effectively utilize the solid lubrication effect of graphite.

The reason why the weight of the total solid lubricant containing graphite as the main component is blended in a weight 0.1 to 2.0 times the weight of the binder resin is as follows.

The lower limit is defined as 0.1 times because if it is less than 0.1 times, the "black tape-shaped secondary products" are less likely to be produced within a range without any problem, but the amount of the solid lubricant itself is small, and thus the lubricating effect cannot be maintained. The reason why the upper limit is set to 2.0 times is that if the upper limit exceeds 2.0 times, the "black tape-shaped secondary products" are produced more than necessary, and frequently cause seizure.

The reason why the PEEK resin and graphite were selected is also that both the PEEK resin and the graphite have water repellency. In the present embodiment, commercial products often require corrosion resistance, in addition to lubricity, on the premise that the connection for oil country tubular goods are exposed outdoors for about 1 to 2 years in a state where the connection for oil country tubular goods are attached with a protector, and left until use. Therefore, it is also intended to keep the anticorrosion property by the water repellency of the PEEK resin and graphite when the component to be secondarily contained is introduced. In addition, since the hard film can be reduced in minute cracks, it is possible to maintain lubricity and realize anticorrosion property.

<Composition of Agent>

The agent contains a solvent in order to adjust the drying property and liquid viscosity such that the solvent does not remain in the coating film. A component weight ratio of the solvent is preferably 30 to 80% with respect to the sum of the weight of the solid lubricant components and the weight of the binder resin component.

The components forming the solid lubricating coating film are prepared in a state of being dissolved in the solvent. The agent is applied, and dried by volatilizing and firing the solvent, or irradiating the solvent with far-infrared rays, ultraviolet rays, or the like to form a film.

In the present disclosure, a weight ratio of the solvent component is 30 to 80% with respect to the sum of the solid lubricant component weight and the binder resin component weight. The material for the solvent is not particularly limited. The solvent may be a polar solvent or a nonpolar solvent.

Since the PEEK resin needs to be fired at a temperature higher than 350° C., these solvents need to be volatilized/evaporated to the temperature range. The reason why the solvent component was blended as small as 80% is that black lead easily floats in the solvent when the liquid viscosity is adjusted. In addition, this is to prevent black lead from being biased to the surface side when a solid lubricating coating film is formed. Therefore, the upper limit was defined as 80%.

The lower limit was set to 30% in order to avoid failure to apply the agent, since the liquid viscosity of the agent is high, if the lower limit is less than 30%.

Examples of polar solvents include DMF (N, N-dimethylformamide), NMP (N-methyl-2 pyrrolidone), DMSO (dimethyl sulfoxide), methanol, and ethanol. Examples of non-polar solvents include n-hexane, toluene, xylene, dioxane, and THE (tetrahydrofuran).

Examples of the organic solvent include MEK (methyl ethyl ketone) and MIBK (methyl isobutyl ketone) as ketone-based solvents, ethyl acetate and butyl acetate as ester-based solvents, and methanol, ethanol, and IPA (isopropyl alcohol) as alcohol-based solvents.

Then, the solvent is volatilized and fired, or irradiated with far-infrared rays, ultraviolet rays, or the like to form a film. By removing the solvent and forming a film, it is possible to achieve both lubrication and corrosion resistance.

<Characteristics of Solid Lubricating Coating Film>

By applying the agent of the present embodiment and removing the solvent component to form a solid lubricating coating film, the solid lubricating coating film is utilized as a film having both lubricity and anticorrosion property.

The idea and construction of the present disclosure themselves are based on achievement of lubrication of the solid lubricating coating film of the connection for oil country tubular goods.

As shown with reference to FIGS. 2A to 4B, during make-up/break-out of the connection for oil country tubular goods, in particular, at the initial stage of make-up and the final stage of break-out, the solid lubricating coating film is damaged by rattling until the threads are engaged with each other. In addition, when graphite is used as the main component of the solid lubricant, "black tape-shaped secondary products" often appear. As a means for reducing the influence of the products, the present disclosure defines an optimal range.

However, this idea can be utilized not only for lubrication of the connection for oil country tubular goods, but also for improvement in lubrication. Therefore, it is assumed that the idea is applied extensively up to a solid lubricating coating film widely formed on a metal material.

<Suitable Ranges of Film Hardness and Film Thickness>

Each of the formed coating films has a pencil hardness of preferably 3H or more, and a film thickness of preferably 10

µm or more and 150 µm or less. There is no upper limit on the hardness of the coating film, and the higher the hardness, the better.

When the film is hard, the "black tape-shaped secondary products" that often appear can be reduced. If the film has a pencil hardness of 3H or more, the effect is high, resulting in a number of times of make-up/break-out exceeding the target level.

Here, the PEEK resin singly has a pencil hardness of about 3H to 5H, and thus the solid lubricating component is added so as not to lower the hardness. As described above, in order to actively increase the hardness of the PEEK resin, a glass fiber or a carbon fiber may be added.

Regarding the film thickness, it is necessary to form a film having a film thickness of at least 10 µm in order to maintain lubricity and corrosion resistance. Regarding an upper limit on the film thickness, the void between the box connection and the pin connection varies depending on the type and design of the connection for oil country tubular goods. Therefore, the upper limit was difficult to define uniformly, but was set to 150 µm. Since many connections for oil country tubular goods are designed with an upper limit on the void between the threads being 100 µm to 150 µm in size, 150 µm was defined as the upper limit on the film thickness. More preferably, the film thickness is preferably 10 to 50 µm.

Here, there may be voids between threads and valleys of the male thread and the female thread of 100 to 150 µm in size as described above. However, the voids between the stabbing flanks of the male thread and the female thread and the voids between the load flanks vary between the time of make-up and the time of break-out. When the voids are narrow, the films are almost closely adhered to each other. Therefore, the film thickness is preferably in the range of 10 µm to 50 µm. There is an actual state in which the binder resin is scraped off at the time of make-up/break-out. In addition, the film applied at room temperature is actually crushed into a thin film. Therefore, even if the film thickness is larger than the assumed void size, no problem occurs.

The pencil hardness of the solid lubricating coating film is measured by the method specified in JIS K 5600-5-4 (1999). It is clearly stated in the JIS standard that this standard is a translation of the "ISO/DIS 15184, Paints and varnishes—Determination of film hardness by pencil test" standard. However, the pencil hardness test method itself was evaluated based on the definition in the JIS standard. In addition, the reason why the film hardness is evaluated as pencil hardness is that evaluation is made by "scratching" the film with a pencil. This is because the method for evaluating the film hardness is performed by "scratching", which is similar to the behavior in which the solid lubricating coating films of the male thread and the female thread of the connection for oil country tubular goods are peeled off. In the film hardness measurement methods by pushing, i.e., Rockwell, Vickers, Shore, and Knoop, which are sometimes used for a coating film or the like, the coating film is thin and affected by a base. Therefore, pencil hardness was used in the present disclosure.

<Base Layer Under Solid Lubricating Coating Film>

When the metal material or the oil country tubular goods are carbon steel or low alloy steel, it is preferable that a base layer formed of an electroplating film or a chemical conversion-treated film is present between the metal material or the oil country tubular goods and the solid lubricating coating film.

Here, when the metal material or the oil country tubular goods are made of a stainless steel material, a Ni-based alloy, or a Ti alloy, an electroplating film is preferably present as the base layer. This is to enhance the close adhesion of the solid lubricating coating film.

<Method for Manufacturing Solid Lubricating Coating Film>

It is actually possible to form a film, for example, by applying the agent at a desired thickness at once, followed by firing.

However, the method preferably includes film formation divided into a plurality of times. Furthermore, it is preferable to perform the following procedure rather than performing main firing every time a film is formed.

That is, the thickness of the solid lubricating coating film to be formed at one time is set to 50 µm or less, and film formation is repeated a plurality of times while a temporary drying step is interposed every time or about once every two times between the film formation and the film formation, so that films of 50 µm or less are formed in an overlapping manner. Then, in the final film formation, the temporary drying is stopped and the film is dried in the main drying step. As the main drying step, firing, or infrared irradiation, ultraviolet irradiation, hot air or any other drying means, or a means of leaving in the air or natural drying is employed.

The final total film thickness of the solid lubricating coating films to be formed is preferably adjusted to 10 to 150 µm.

In the present embodiment, a film is formed using an agent in which a solid lubricant mainly composed of black lead and a binder resin mainly composed of a PEEK resin are dissolved in a solvent.

The agent of the present embodiment contains a large amount of the film components relative to the solvent, and has high viscosity. Therefore, when the film is formed to attain a target film thickness at a time, the liquid tends to be pulled to provide a smaller thickness at a corner portion on the thread due to the influence of surface tension along the connection for oil country tubular goods structure, and the liquid tends to accumulate at the corner portion on the root. Therefore, it is preferable to divide film formation into a plurality of times and fire the film. However, when the main firing is performed a plurality of times, the close adhesion between the films tends to be weak and easily peeled off between the layers. Therefore, temporary firing is performed in a state where a part of the solvent component is removed. Then, the operations of applying the agent and performing temporary firing are repeated again. As described above, film formations are preferably performed until a necessary film thickness is attained while temporary firing is performed between the film formations, before main firing. This is because this method effectively functions for attaining uniform film quality and uniform film thickness. The temporary drying step refers to drying for merely removing a part of the solvent (for example, 30% to 70%).

In addition, from the viewpoint of corrosion resistance, it is difficult to form pinholes so as to penetrate the entire film in the case of multiple film formation, and thus the effect is obtained also in this respect.

<Surface on which Solid Lubricating Coating Film is Formed>

In the solid lubricating coating film of the present embodiment, the solid lubricating coating film is formed on one or both of a coupling side (female thread side) and a pin side (male thread side) of the connection for oil country tubular goods.

Alternatively, it is preferable that the solid lubricating coating film of the present embodiment is formed on either one of the coupling side (female thread side) and the pin side (male thread side), and that a softer film different from the solid lubricating coating film is formed on the tightening surface on the other and used.

In the latter case, another type of softer film formed on the side where the solid lubricating coating film of the present embodiment is not formed more preferably has a film hardness of 4B or less as pencil hardness. The latter is a method for further improving the lubrication characteristics.

The lubrication characteristics can be expected to be further improved by making one of the films softer than the film of the present disclosure and making the films face each other rather than making films having favorable lubrication characteristics face each other to realize lubrication.

In the latter case, it can be expected that the softer coating film deforms itself to reduce the surface pressure in a situation where spike-like torque is generated during make-up/break-out in a situation where there is rattling until the connection is engaged with each other (phase 1: region (x) in FIG. 4A). In addition, the hard coating film of the present disclosure mainly formed of graphite and PEEK can be expected to provide high lubrication over the entire area of make-up/break-out of the connection.

As the softer film having a film hardness of 4B or less as pencil hardness, for example, the following film may be adopted.

<Soft Film>

In the present disclosure, the softer film is a solid lubricating coating film. The softer film is not a liquid, semi-solid, or viscoelastic film, such as a grease-like compound or any other similar film. That is, in the present disclosure, a soft film that comes off when touched by hand is excluded.

In addition, the soft film having a pencil hardness of 4B or less (meaning that the film has a pencil hardness of 4B, 5B, 6B, . . . ) is, for example, formed of a binder resin including organic and inorganic resins. Alternatively, the softer film may be formed of a dried alkaline soap layer (an uppermost layer of a bonder lube film) or the like.

When the softer film is formed of a resin-based film, for example, a film made of any type of resin such as an epoxy resin, an acrylate resin, a polyester resin, a polyether resin, a polycarbonate resin, a fluororesin, or an aqueous acrylic resin may be used. However, in order to obtain a soft film hardness, it is preferable to widen an interval between crosslinking points so as to prevent these resins from being made hard, and to design the film so as not to have a three-dimensional complicated crosslinking points. In addition, a simple crosslinked structure can make a film softer than a film having three-dimensionally complicated crosslinking points. When explanation is made using other parameters, it is preferable to select a monomer in which the number of functional groups and the number of epoxy groups are small as each monomer constituting the softer film. That is, those having a large functional group equivalent and epoxy equivalent are preferably selected. The epoxy equivalent is a numerical value obtained by dividing the molecular weight of each monomer by the number of functional groups contributing to the crosslinking reaction in the monomer. That is, it is synonymous with reducing the number of crosslinking points. In addition, it is preferable not to incorporate an additive that hardens the film quality, for example, a carbon fiber or a glass fiber. Alternatively, there is a method of softening the film by incorporating a larger amount of the solid lubricant.

A lower limit on the hardness of the softer film is not particularly defined. However, the hardness up to 6B in the pencil hardness standard is defined as the lower limit on the hardness to be measured, and thus "≤6B (meaning unmeasurable)" is included in the target hardness range. However, the lower limit on the film hardness may be 8B as pencil hardness as long as the film is recognized as the solid lubricating coating film, except liquid, semi-solid, and viscoelastic films. That is, when the film hardness is measured using pencils of 7B to 10B, the film hardness is out of the pencil hardness standard, but about 8B can be defined as the lower limit.

<Method for Evaluating Lubrication Characteristics>

The present embodiment defines each material from the viewpoint of realizing the lubrication characteristics that can withstand an environment that can occur in an actual well. In addition, when upper and lower limits are defined, the upper and lower limits are determined by performing confirmation (test) under conditions conforming to make-up/break-out conditions in an actual well.

In horizontal and vertical power tong-based methods using a short pin as performed in a normal laboratory test, the make-up/break-out conditions do not conform to conditions in an actual well, and, in the case of a solid lubricating coating film, the evaluation conditions are lenient. Therefore, it is meaningless to explain the definition of the upper and lower limits on each material by evaluation in a normal laboratory test. Unless the conditions are very strict, the number of times of make-up/break-out is determined as acceptable. In the present disclosure, a new laboratory test capable of simulating a situation in an actual well was devised, and evaluation was made under conditions along those in an actual well in the new laboratory test. The new laboratory test is also referred to as weight tong test.

<Test Method for Simulating Actual Well Test Condition (New Laboratory Test (Weight Tong Test)>

In the present embodiment, as described with reference to FIGS. 2A to 4B, the phenomenon happening in lubrication of the connection for oil country tubular goods are considered in two stages, i.e., before the threads are engaged (phase 1: region (x) in FIG. 4A) and after the threads are engaged (phase 2: regions (y) and (z) in FIGS. 4A and 4B). Then, in consideration of the make-up/break-out (lubrication) at the first stage (phase 1), a method of comprehensively evaluating thread lubrication including the lubrication at the second stage (phase 2) was considered.

If this evaluation is not performed, troubles frequently occur in an actual well although thread lubrication is evaluated as OK in the laboratory test. In an actual well, since a large load and an unbalanced load are applied before the threads are engaged with each other, the solid lubricating coating film may be damaged or peeled off, or, in a severe case, may be completely peeled off. Based on this, upper and lower limits on the suitable ranges of the parameters of the present embodiment were selected.

As described above, in the case of the solid lubricating coating film, damage to the coating film cannot be avoided due to make-up or the like until the threads are engaged. Then, secondary products are formed based on the peeled product. If the secondary products are clogged in the thread gap, seizure occurs. Therefore, if the lubrication evaluation is not performed under the conditions conforming to those in an actual well, there is a concern that even a solid lubricating coating film that is actually unacceptable is erroneously determined as acceptable. If determination is based on such lenient evaluation, it will be meaningless to limit upper and lower limits on the parameters related to the solid lubricating coating film and to select suitable ranges.

That is, on the premise of damage or peeling of the solid lubricating coating film, if it is not considered whether secondary products produced based on the damaged or peeled solid lubricating coating film, that is, reconstituted "secondary products" affect lubrication, an accurate solid lubricating coating film cannot be obtained. In the present embodiment, evaluation is performed through a new laboratory test taking such finding into consideration.

Note that it will be meaningless to evaluate the solid lubricating coating film with a horizontal type power tong using a short pin or conventionally (evaluation through a conventional laboratory test) with a vertical type power tong using a short pin. The past patent literatures often indicate that, in a lubrication test based on a solid lubricating coating film, make-up/untighetening can be performed up to 15 to 20 times even in the case of a large diameter size of 9⅝" or 13⅜". In this indication, the solid lubricating coating film provides slightly inferior lubrication to that obtained using the grease-like compound, but the number of times of make-up/break-out is substantially impossible in the case of the solid lubricating coating film. These results appear to be obtained from evaluations with a horizontal or vertical power tong using a short pin, which are often seen in conventional laboratory tests. In a large diameter case with a solid lubricating coating film for make-up/break-out in an actual well, make-up/break-out can rarely be performed at a level of 15 to 20 times.

Figure 5:
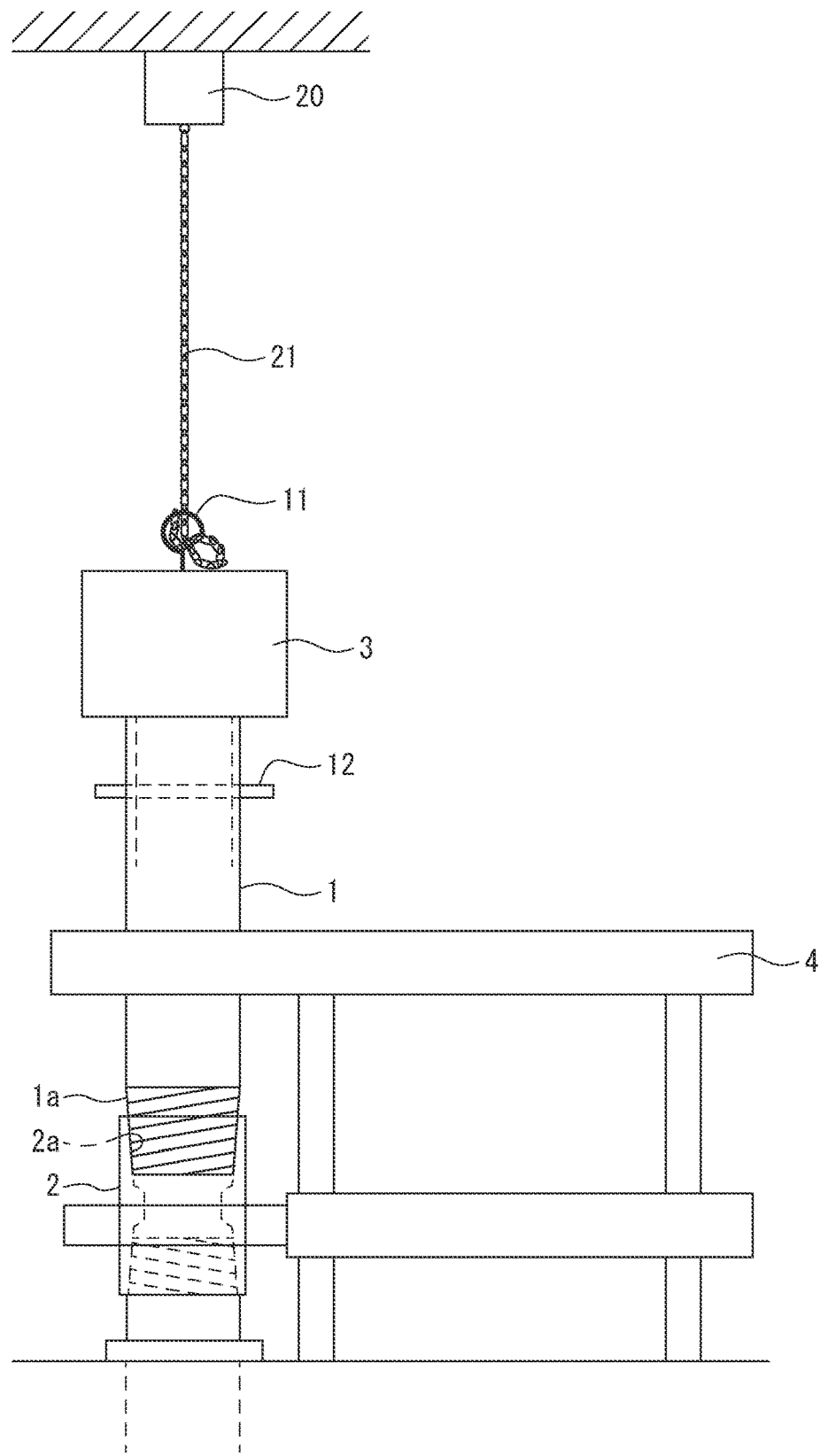
FIG. 5 is a diagram for explaining a new laboratory test (weight tong test)

In the present embodiment, the test was conducted with the device configuration illustrated in FIG. 5 based on the conditions of the new laboratory test.

The new laboratory test is based on evaluation under conditions that a large load at the time of make-up and an unbalanced load condition at the time of make-up/break-out can be realized. For example, in the case of a process in which the threads are made up upon application of a large load equivalent to that in the case of an actual size pin, rattling until the threads are engaged with each other is considered. In addition, in the case of a process of breaking out the connection, the feature that the threads were disengaged from each other and that rattling occurs is reflected.

In the new laboratory test, a vertical power tong 4 is used. In addition, a short pin 1 is adopted as a test pin. However, it is possible to apply a load to an upper portion of the pin 1 by a weight 3 and to remove the load.

Then, the connection of the short pin 1 and the connection of the box 2 are made up by a pin thread portion 1a and a box thread portion 2a.

At this time, in order to simulate a situation where the threads are not engaged with each other, an initial temporary make-up position is set such that, in the pin connection thread 1a, a half of the total number of threads is exposed from the box 2 (see FIG. 2B)). This is one of causes of rattling. Make-up is started from that state.

At the time of make-up, the weight 3 is attached to an end of the pin 1 on a side opposite to the making up connection of the box 2.

A weight of the weight 3 is calculated based on the actual size pin having the outer diameter and thickness of the pin as a load equivalent to one to three actual pins. In the case of 9⅝" 53.5 #, the load is about 1 t per pin (2,200 Lb), and is about 3 tons (6, 600 Lb) when equivalent to connected three pins.

Figure 6:
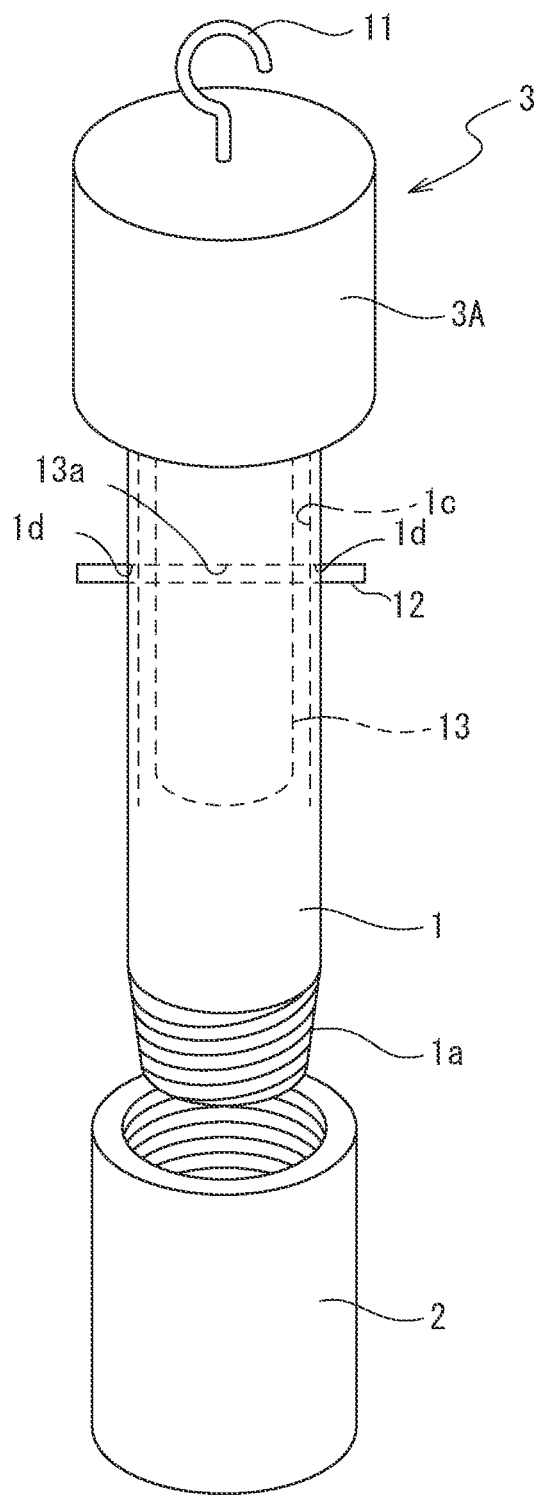
FIG. 6 is a diagram illustrating an installation example of a weight in the new laboratory test (weight tong test)

As illustrated in FIG. 6, the weight 3 illustrated in FIG. 5 includes a weight main body 3A and an insertion rod 13. The insertion rod 13 is joined to a lower surface of the weight main body 3A by welding, and is disposed at an axisymmetric position of the weight 3. By inserting the insertion rod 13 into the pin 1 in a loosely inserted state, the weight is attached to the pin. Reference numeral 1c denotes an inner diameter surface of the pin 1.

When the weight 3 is attached to the insertion rod 13 and the pin 1 in advance as described above, holes 1d and 13a penetrating the pin 1 and the insertion rod 13 are formed in advance. Then, as illustrated in FIG. 6, the weight 3 and the pin 1 are integrated by inserting a penetrating rod 12 into the holes 1d and 13a.

A pot-hook (Swivel) type hook 11 is attached to an axial center position of an upper portion of the weight 3 by welding, and is suspended from a ceiling suspension device 20 via a suspension chain 21. As a result, the magnitude of the load of the weight applied to the pin can be adjusted by adjusting a lifting level of the weight by the suspension device 20.

At the time of make-up, the suspension chain 21 is loosened, the weight load is applied to the box connection, and make-up is performed at 5 to 20 rpm until torque is generated (phase 1). This is a simulation of rattling. When the torque is generated, the rotation speed is decreased to 0.5 to 2 rpm, and make-up is performed up to a make-up position (phase 2).

On the other hand, at the time of loosening (break-out), the weight 3 is lifted by the suspension device 20, and break-out is performed in a state where the load of the weight 3 is not applied. At a place where the torque is generated, loosening is started at a rotation speed of 0.5 to 2 rpm. When the torque reaches about ¹⁄₁₀ of the make-up torque value, break-out is performed at a high rotation speed of 5 to 20 rpm.

Here, the condition that no load is applied at the time of break-out is closer to that in an actual well environment. This is a finding based on data indicating that the lubrication characteristics were better in the case of applying the load of the weight 3 than in the case of not applying the load, based on the experimental fact. That is, as a result of an actual experiment and observation, the inventor has found that, when break-out is performed in a state where the weight is applied, the weight serves as a balancer, and the pin is loosened straight from a make-up completion position without rattling. On the other hand, in a case where the weight is reduced, that is, in a case where a test is performed while the load is lifted in order to reduce the weight load to zero, the test can be performed under conditions where the pin is more rattled so that the solid lubricating coating film is more likely to be damaged in a situation where the load is reduced and the joint is loosened, including a case where the load is not completely zero.

In the new laboratory test under the above conditions, it is possible to simulate a situation in which the secondary products do not move following the make-up/break-out and are clogged at a certain place to cause seizure, or a situation in which the coating film itself is completely peeled off. The secondary products are products of a component derived from the solid lubricating coating film that is released into the thread gap due to unavoidable peeling or the like. As a result, the upper and lower limits on the parameters related to the solid lubricating coating film can be defined as conforming to actual well conditions. Evaluation was performed in such a manner that, after completion of the break-out, the pin connection and the box connection were separated from each other, the surface was subjected to air blowing to remove debris and the like derived from the solid lubricating coating film, the surface was checked, and the make-up was continued again.

In the present embodiment, the components and the like are defined in order to realize the lubrication characteristics that can withstand an environment that can occur in an actual well. In addition, when upper and lower limits are defined, the upper and lower limits are determined by performing confirmation under conditions conforming to make-up/break-out conditions in an actual well.

Effects of Present Embodiment

In the field of lubrication using a solid lubricating coating film of a connection for oil country tubular goods, the present embodiment realizes high lubrication that withstands make-up in an actual well. Conventionally, there are many inventions relating to a solid lubricating coating film utilizing graphite. However, actually, "black tape-shaped secondary products" formed by reconstituting graphite and a binder resin component, which are inevitably peeled off at the time of make-up and break-out, cause seizure in most cases.

On the other hand, in the present embodiment, the amount of graphite and the blending ratio are optimized, and, in particular, the solid lubricant is not formed only of graphite. Furthermore, as an appropriate binder resin, a PEEK resin which has been hardly applied in combination with graphite is selected. In addition, by clarifying the weight ratio of graphite in the solid lubricating coating film, seizure that often occurs during solid lubrication mainly using graphite is avoided.

From the above, in the present embodiment, high lubrication is achieved. In addition, by blending the components within the ranges of the present disclosure, high lubrication can be realized while eliminating seizure or instability of lubrication which is conventionally unavoidable when graphite is selected as a solid lubricating component.

At the same time, corrosion resistance can also be achieved in the present embodiment.

Furthermore, the application of the present embodiment may be expanded not only to lubrication of the connection for oil country tubular goods but also to other metal materials. In addition, the present embodiment is directed not only to the film, but also to an agent for forming the film.

(Others)

The present disclosure can also take the following configurations.

(1) An agent for forming a solid lubricating coating film in a thread portion of oil country tubular goods, the agent containing: a binder resin; and two or more types of solid lubricants dispersed in the binder resin, wherein graphite is contained, as one of the two or more types of solid lubricants, in an amount of 50% or more and 90% or less of a total weight of the solid lubricants, the graphite having a scaly shape and an average particle diameter of 10.0 μm or less, a solid lubricant made of one or more materials selected from BN (boron nitride), mica, talc, MCA (melamine cyanurate), $MoS_2$ (molybdenum disulfide), PTFE (polytetrafluoroethylene), PFA (perfluoroalkoxyalkane; tetrafluoroethylene-perfluoroalkoxyethylene copolymer resin), and FEP (perfluoroethylene propene copolymer; tetrafluoroethylene-hexafluoropropylene copolymer) is further contained as other solid lubricants of the two or more types of solid lubricants, and the binder resin contains a PEEK resin having an average particle diameter of 20 μm or less as a main component, the PEEK resin being contained in an amount of 70% or more of a total weight of the binder resin.

(2) The total weight of the solid lubricants is 0.1 times or more and 2 times or less the total weight of the binder resin, and a content of the graphite as the solid lubricant is 20% or more and 50% or less of a sum of the total weight of the solid lubricants and the total weight of the binder resin.

(3) The agent for forming a solid lubricating coating film further contains a solvent, and a weight ratio of the solvent is 30% or more and 80% or less with respect to a weight of the sum of the total weight of the solid lubricants and the total weight of the binder resin.

(4) At least PTFE is contained as the other solid lubricants, and the PTFE has an average particle diameter of 0.1 μm or more and 5 μm or less.

(5) Oil country tubular goods including a lubricating coating film including a solid lubricating coating film, the lubricating coating film being formed in a thread portion, wherein the lubricating coating film including the solid lubricating coating film is formed on a tightening surface of the thread portion in at least one component of the box and the pin, the solid lubricating coating film is formed by dispersing a solid lubricant in a binder resin, graphite is contained, as one of the two or more types of solid lubricants, in an amount of 50% or more and 90% or less of a total weight of the solid lubricants, the graphite having a scaly shape and an average particle diameter of 10.0 μm or less, a solid lubricant made of one or more materials selected from BN (boron nitride), mica, talc, MCA (melamine cyanurate), $MoS_2$ (molybdenum disulfide), PTFE (polytetrafluoroethylene), PFA (perfluoroalkoxyalkane; tetrafluoroethylene-perfluoroalkoxyethylene copolymer resin), and FEP (perfluoroethylene propene copolymer; tetrafluoroethylene-hexafluoropropylene copolymer) is further contained as other solid lubricants of the two or more types of solid lubricants, and the binder resin contains a PEEK resin having an average particle diameter of 20 μm or less as a main component, the PEEK resin being contained in an amount of 70% or more of a total weight of the binder resin.

(6) The total weight of the solid lubricants is 0.1 times or more and 2 times or less the total weight of the binder resin, and a content of the graphite as the solid lubricant is 20% or more and 50% or less of a sum of the total weight of the solid lubricants and the total weight of the binder resin.

(7) At least PTFE is contained as the other solid lubricants, and the PTFE has an average particle diameter of 0.1 μm or more and 5 μm or less.

(8) The solid lubricating coating film includes a thread of the thread portion and is formed up to a region adjacent to the thread.

(9) The solid lubricating coating film has a hardness of 3H or more as pencil hardness.

(10) The solid lubricating coating film has a film thickness of 10 μm or more and 150 μm or less

(11) A material for the oil country tubular goods are carbon steel or low alloy steel, the lubricating coating film has a base layer between a tightening surface of the thread portion and the solid lubricating coating film, and the base layer is formed of an electroplating film or a chemical conversion-treated film.

(12) A material for the oil country tubular goods are a stainless steel material, an Ni-based alloy, or a Ti alloy, the lubricating coating film has a base layer between a tightening surface of the thread portion and the solid lubricating coating film, and the base layer is formed of an electroplating film.

(13) A threaded joint for oil country tubular goods configured to connect a box having a female thread and a pin having a male thread, wherein at least one oil country tubular goods of the box and the pin is formed of the oil country tubular goods of the present disclosure which is formed with the lubricating coating film.

(14) A lubricating coating film including the solid lubricating coating film is formed on a tightening surface of a thread portion of one component of the box and the pin, and a film softer than the solid lubricating coating film is formed on a tightening surface of a thread portion of the other component of the box and the pin.

(15) The softer film has a film hardness of 4B or less as pencil hardness.

(16) A method for manufacturing the oil country tubular goods described above, the method including: using the agent according to any one of claims 1 to 4; performing a film formation step of applying the agent to form a solid lubricating coating film having a film thickness of 50 µm or less repeatedly a plurality of times with a temporary drying step interposed between the film formation steps until a target total film thickness is attained; performing a main drying step after the last film formation step, the main drying step being performed by firing, infrared irradiation, ultraviolet irradiation, or by a drying means with hot air, or by a means of leaving in the air or natural drying; and adjusting a total film thickness of the solid lubricating coating film to 10 µm or more and 150 µm or less.

EXAMPLES

Next, examples based on the present embodiment will be described.

First, criteria for determining acceptance of the lubrication behavior based on the number of times of make-up/break-out will be described. The determination criteria are as follows. The casing size was determined to be acceptable when make-up/break-out could be performed three times or more, and to be more excellent when make-up/break-out could be performed five times. The tubing size was determined to be acceptable when make-up/break-out could be performed five times or more, and to be more excellent when make-up/break-out could be performed ten times or more. The casing size is defined in accordance with ISO 13679. On the other hand, tubing was regarded as acceptable from five times or more which is lower than the number of times defined in ISO 13679. Because of the solid lubricating coating film, the number of times of make-up/break-out tends to be worse than that in the case of conventional lubrication using a grease-like compound, which is also being recognized in the oil and gas industry. As described above, the definition given in ISO 13679 would be a simple goal if a make-up and break-out test is performed simply using a short pin from when the threads are engaged with each other. However, in the present disclosure, evaluation is made through a new laboratory test (weight tong test) in order to simulate conditions that a large load and an unbalanced load are applied and there is backlash in which the threads are not engaged with each other, which are close to conditions that can actually occur in a well. Therefore, this criterion was used. The classification of tubing and casing varies depending on the design of the well at each site, but, in the present disclosure, products having a size up to 7" were positioned as tubing and those having a larger size were positioned as casing. That is, the criteria for acceptance are different at 7 inches.

As the weights, weights of round numbers such as 1 ton, 1.5 ton, 2 ton, and 3 ton in the MKS unit were adopted based on conditions that a plurality of connected loads were loaded. Then, the weight was attached to the upper portion of the pin connection (see FIG. 5).

As the initial make-up position, make-up was performed only up to a position where a half of the total number of pin threads was exposed and visible from the box connection, i.e., from a state where the threads were not engaged with each other (position where a half of the threads was exposed).

That is, the present embodiment was implemented by the device as illustrated in FIGS. 5 and 6.

In addition, a load of the weight was applied at the time of make-up. On the other hand, at the time of break-out, the test was conducted in a state in which the load of the weight was devised so as not to be applied. In a case where a test is conducted under a load at the time of break-out, the behavior is different from that of an actual size pin in an actual well when a pin in which a short pin and a weight are integrated is used. Specifically, the short pin integrated with the weight is erected straight from the make-up position. Since the weight serves as a balancer, rattling does not occur. There is a high tendency that the pins adopted in an actual well are long and thus slightly bent, and gradually move around, and are rattled as the threads are not engaged with each other, and destroy the solid lubricating coating film.

Therefore, in the lubrication evaluation using the weight tong, a load was not applied at the time of break-out, and rattling that occurred in conjunction with the make-up was simulated when the situation became close to the situation in which the threads were not engaged with each other. Not applying any load does not necessarily mean a zero load. The weight was lifted with the ceiling crane or the like to conduct the test without application of any load. In addition, the test for confirming the number of times of make-up/break-out using the weight tongs was conducted twice or more to determine whether or not the number of times of make-up/break-out achieved the criterion for acceptance, based on comparative evaluation of the number of achievements relative to the test score, and it was determined whether or not the parameters were acceptable.

Example 1

In Example 1, evaluation of the lubrication characteristics using the weight tong will be described.

The conditions and evaluation results of the Examples are shown in Tables 1 to 6. The solid lubricating coating film is also referred to as coating film.

TABLE 1

| No. | Steel type | OD (inch) | WT (LPF) | Screw type | Weight tong load | Side where the coating film is formed | Base film and base treatment | Solid lubricant (one type or two or more types) | | | |
|---|---|---|---|---|---|---|---|---|---|---|---|
| | | | | | | | | Graphite (wt %; total solid lubricant ratio) | Graphite shape | Graphite average particle diameter (µm) | Other solid lubricant components |
| 1 | C110 | 7" | 29 # | JFELION ™ | 1.5 ton (three connected pins are assumed) | CPLG screw | MnPhos | 100* | Scaly (flaky) | 5 | None* |

TABLE 1-continued

| No. | | | | | | | | | | | |
|---|---|---|---|---|---|---|---|---|---|---|---|
| 2 | C110 | 7" | 29 # | JFELION ™ | 1.5 ton (three connected pins are assumed) | CPLG screw | MnPhos | 90 | Scaly (flaky) | 10 | PTFE (0.3 μm) |
| 3 | C110 | 7" | 29 # | JFELION ™ | 1.5 ton (three connected pins are assumed) | CPLG screw | MnPhos | 75 | Scaly (flaky) | 5 | PTFE (0.3 μm) |
| 4 | C110 | 7" | 29 # | JFELION ™ | 1.5 ton (three connected pins are assumed) | CPLG screw | MnPhos | 60 | Scaly (flaky) | 5 | PTFE (0.3pm) |
| 5 | C110 | 7" | 29 # | JFELION ™ | 1.5 ton (three connected pins are assumed) | CPLG screw | MnPhos | 60 | Scaly (flaky) | 5 | PTFE (5 μm) |
| 6 | C110 | 7" | 29 # | JFELION ™ | 1.5 ton (three connected pins are assumed) | CPLG screw | MnPhos | 60 | Scaly (flaky) | 5 | PTFE (10 μm*) |
| 7 | C110 | 7" | 29 # | JFELION ™ | 1.5 ton (three connected pins are assumed) | CPLG screw | MnPhos | 60 | Scaly (flaky) | 5 | Glass fiber + PTFE(0.1 μm) |
| 8 | C110 | 7" | 29 # | JFELION ™ | 1.5 ton (three connected pins are assumed) | CPLG screw | MnPhos | 60 | Scaly* (leaf vein-shaped) | 5 | PTFE (0.3 μm) |
| 9 | C110 | 7" | 29 # | JFELION ™ | 1.5 ton (three connected pins are assumed) | CPLG screw | MnPhos | 60 | Earthy black lead* (amorphous) | 5 | PTFE (0.3 μm) |
| 10 | C110 | 7" | 29 # | JFELION ™ | 1.5 ton (three connected pins are assumed) | CPLG screw | MnPhos | 50 | Scaly (flaky) | 5 | PTFE (0.3 μm) |
| 11 | C110 | 7" | 29 # | JFELION ™ | 1.5 ton (three connected pins are assumed) | CPLG screw | MnPhos | 40* | Scaly (flaky) | 5 | Mica + talc |

| | Binder resin (ons type or two or more types) | | | Blending ratio of solid lubricant | |
|---|---|---|---|---|---|
| No. | PEEK (wt %; total solid lubricant ratio) | PEEK average particle diameter (μm) | Other binder resin components | Total weight of solid lubricant/ total weight of binder resin (times) | Graphite weight/ total coating weight(%) |
| 1 | 100 | ≤1 | — | 0.5 | 33 |
| 2 | 100 | ≤1 | — | 1.0 | 45 |
| 3 | 100 | ≤1 | — | 0.8 | 33 |
| 4 | 100 | ≤1 | — | 1.0 | 30 |
| 5 | 100 | ≤1 | — | 2.0 | 40 |
| 6 | 100 | ≤1 | — | 1.8 | 39 |
| 7 | 100 | ≤1 | — | 1.8 | 39 |
| 8 | 100 | ≤1 | — | 1.5 | 36 |
| 9 | 100 | ≤1 | — | 1.9 | 39 |
| 10 | 100 | ≤1 | — | 2.0 | 33 |
| 11 | 100 | ≤1 | — | 1.5 | 24 |

TABLE 2

| No. | Pencil hardness | Film thickness (μm) | Selection of solvent | Solvent weight/ (solid lubricant weight + binder resin)(%) | Side to which the coating film is not attached | Base | Solid lubricant | Binder resin | Pencil hardness of solid lubricating coating film | Number of M/B times | Whether number of M/B times is acceptable or unacceptable | Remarks |
|---|---|---|---|---|---|---|---|---|---|---|---|---|
| 1 | 4H | 50 | NMP | 60 | PIN screw | Shot blasted | — | — | — | 2 times<br>3 times<br>2 times | All cases unacceptable/<br>n = 3 | Comparative example |
| 2 | 4H | 55 | NMP | 60 | PIN screw | Shot blasted | PTFE | Fluororesin | 5B | 5 times<br>5 times | All cases acceptable/<br>n = 2 | Inventive example |
| 3 | 4H | 50 | NMP | 60 | PIN screw | Shot blasted | PTFE | Fluororesin | 5B | 7 times<br>8 times<br>5 times | All cases acceptable/<br>n = 3 | Inventive example |
| 4 | 4H | 50 | NMP | 60 | PIN screw | Shot blasted | PTFE | Fluororesin | 5B | 8 times<br>9 times<br>8 times | All cases acceptable/<br>n = 3 | Inventive example |
| 5 | 4H | 50 | NMP | 60 | PIN screw | Shot blasted | PTFE | Fluororesin | 5B | 7 times<br>7 times<br>6 times | All cases acceptable/<br>n = 3 | Inventive example |
| 6 | 4H | 50 | NMP | 60 | PIN screw | Shot blasted | PTFE | Fluororesin | 5B | 5 times<br>6 times<br>5 times | All cases acceptable/<br>n = 3 | Inventive example |
| 7 | 7H | 50 | NMP | 60 | PIN screw | Shot blasted | PTFE | Fluororesin | 5B | 8 times<br>≥10 times (finished in 10 times)<br>8 times | All cases acceptable/<br>n = 3 | Inventive example |
| 8 | 5H | 50 | NMP | 60 | PIN screw | Shot blasted | PTFE | Fluororesin | 5B | 5 times<br>3 times<br>4 times | 1 case acceptable/<br>n = 3 | Comparative example |
| 9 | 5H | 50 | NMP | 60 | PIN screw | Shot blasted | PTFE | Fluororesin | 5B | 2 times<br>4 times<br>2 times | All cases unacceptable/<br>n = 3 | Comparative example |
| 10 | 5H | 50 | NMP | 60 | PIN screw | Shot blasted | PTFE | Fluororesin | 5B | 9 times<br>≥10 times (finished in 10 times)<br>≥10 times (finished in 10 times) | All cases acceptable/<br>n = 3 | Inventive example |
| 11 | 5H | 50 | NMP | 60 | PIN screw | Shot blasted | PTFE | Fluororesin | 5B | 4 times<br>3 times<br>5 times | 1 case acceptable/<br>n=3 | Comparative example |

TABLE 3

| No. | Steel type | OD (inch) | WT (LPF) | Screw type | Weight tong load | Side where the coating film is formed | Base film and base treatment | Graphite (wt %; total solid lubricant ratio) | Graphite shape | Graphite average particle diameter (μm) | Other solid lubricant components |
|---|---|---|---|---|---|---|---|---|---|---|---|
| 12 | C110 | 9⅝" | 53.5 # | JFELION™ | 3 ton (three or more connected pins are assumed) | CPLG screw | MnPhos | 65 | Scaly (flaky) | 10 | BN |
| 13 | C110 | 9⅝" | 53.5 # | JFELION™ | 3 ton (three or more connected pins are assumed) | CPLG screw | MnPhos | 65 | Scaly (flaky) | 20* | BN |
| 14 | C110 | 9⅝" | 53.5 # | JFELION™ | 3 ton (three or more connected pins are assumed) | CPLG screw | MnPhos | 55 | Scaly (flaky) | 10 | BN |

TABLE 3-continued

| No. | | | | | | | | | | | |
|---|---|---|---|---|---|---|---|---|---|---|---|
| 15 | C110 | 9⅝" | 53.5 # | JFELION ™ | 3 ton (three or more connected pins are assumed) | CPLG screw | MnPhos | 55 | Scaly (flaky) | 3 | BN |
| 16 | C110 | 9⅝" | 53.5 # | JFELION ™ | 3 ton (three or more connected pins are assumed) | CPLG screw | MnPhos | 55 | Scaly (flaky) | 25* | BN |
| 17 | C110 | 9⅝" | 53.5 # | JFELION ™ | 3 ton (three or more connected pins are assumed) | CPLG screw | MnPhos | 55 | Scaly (flaky) | 8 | enhanced with carbon fiber + MoS2 |
| 18 | C110 | 9⅝" | 53.5 # | JFELION ™ | 3 ton (three or more connected pins are assumed) | CPLG screw | MnPhos | 50 | Scaly (flaky) | 8 | BN |
| 19 | C110 | 9⅝" | 53.5 # | JFELION ™ | 3 ton (three or more connected pins are assumed) | CPLG screw | MnPhos | 50 | Scaly (flaky) | 8 | BN |
| 20 | C110 | 9⅝" | 53.5 # | JFELION ™ | 3 ton (three or more connected pins are assumed) | CPLG screw | MnPhos | 25* | Scaly (flaky) | 8 | BN |

| | Binder resin (one type or two or more types) | | | Blending ratio of solid lubricant | |
|---|---|---|---|---|---|
| No. | PEEK (wt %; total solid lubricant ratio) | PEEK average particle diameter (μm) | Other binder resin components | Total weight of solid lubricant/ total weight of binder resin (times) | Graphite weight/ total coating weight(%) |
| 12 | 100 | ≤1 | — | 2.0 | 43 |
| 13 | 100 | ≤1 | — | 1.0 | 33 |
| 14 | 70 | 10 | Epoxy resin | 1.0 | 28 |
| 15 | 60* | 15 | PE resin PP resin | 1.0 | 28 |
| 16 | 70 | 5 | PEKK resin | 1.0 | 28 |
| 17 | 70 | 15 | PAEK resin | 1.5 | 33 |
| 18 | 100 | 10 | — | 2.0 | 33 |
| 19 | 100 | 25* | — | 2.0 | 33 |
| 20 | 100 | 10 | — | 1.8 | 19* |

TABLE 4

| | Physical property value of solid lubricating coating film | | Blending ratio of solvent | | Solid lubricating film on side where no coating film is applied | | | | | | |
|---|---|---|---|---|---|---|---|---|---|---|---|
| No. | Pencil hardness | Film thickness (μm) | Selection of solvent | Solvent weight/ (solid lubricant weight + binder resin)(%) | Side to which the coating film is not attached | Base | Solid lubricant | Binder resin | Pencil hardness of solid lubricating coating film | Number of M/B times | Whether number of M/B times is acceptable or unacceptable | Remarks |
| 12 | 4H | 50 | n-hexane | 60 | PIN screw | Shot blasted | Metal soap (Ste-Ca) | Fluororesin | ≤6B | 7 times 6 times 8 times | All cases acceptable/ n = 3 | Inventive example |
| 13 | 4H | 50 | n-hexane | 60 | PIN screw | Shot blasted | Metal soap (Ste-Ca) | Fluororesin | ≤6B | 4 times 2 times 3 times 2 times | 2 cases acceptable/ n = 4 | Comparative example |
| 14 | 4H | 60 | n-hexane | 30 | PIN screw | Shot blasted | Metal soap (Ste-Ca) | Fluororesin | ≤6B | 8 times 9 times 9 times | All cases acceptable/ n = 3 | Inventive example |
| 15 | 2H * | 60 | n-hexane | 45 | PIN screw | Shot blasted | Metal soap (Ste-Ca) | Fluororesin | ≤6B | 2 times 4 times 5 times | 2 cases acceptable/ n = 3 | Comparative example |
| 16 | 5H | 40 | n-hexane | 45 | PIN screw | Shot blasted | Metal soap (Ste-Ca) | Fluororesin | ≤6B | 2 times 2 times 1 time | All cases unacceptable/ n = 3 | Comparative example |

TABLE 4-continued

| | Physical property value of solid lubricating coating film | | Blending ratio of solvent | | Solid lubricating film on side where no coating film is applied | | | | | | |
|---|---|---|---|---|---|---|---|---|---|---|---|
| No. | Pencil hardness | Film thickness (μm) | Selection of solvent | Solvent weight/ (solid lubricant weight + binder resin)(%) | Side to which the coating film is not attached | Base | Solid lubricant | Binder resin | Pencil hardness of solid lubricating coating film | Number of M/B times | Whether number of M/B times is acceptable or unacceptable | Remarks |
| 17 | 7H | 40 | n-hexane | 30 | PIN screw | Shot blasted | Metal soap (Ste-Ca) | Fluororesin | ≤6B | ≥10 times (finished in 10 times) 8 times ≥10 times (finished in 10 times) | All cases acceptable/ n = 3 | Inventive example |
| 18 | 4H | 40 | n-hexane | 30 | PIN screw | Shot blasted | Metal soap (Ste-Ca) | Fluororesin | ≤6B | ≥10 times (finished in 10 times) ≥10 times (finished in 10 times) ≥10 times (finished in 10 times) | All cases acceptable/ n = 3 | Inventive example |
| 19 | 4H | 40 | n-hexane | 30 | PIN screw | Shot blasted | Metal soap (Ste-Ca) | Fluororesin | ≤6B | 3 times 4 times 2 times | 2 cases acceptable/ n = 3 | Comparative example |
| 20 | 4H | 40 | n-hexane | 30 | PIN screw | Shot blasted | Metal soap (Ste-Ca) | Fluororesin | ≤6B | 1 time 4 times 2 times | All cases unacceptable/ n = 3 | Comparative example |

TABLE 5

| | | | | | | | | Solid lubricant (one type or two or more types) | | | |
|---|---|---|---|---|---|---|---|---|---|---|---|
| No. | Steel type | OD (inch) | WT (LPF) | Screw type | Weight tong load | Side where the coating film is formed | Base film and base treatment | Graphite (wt %; total solid lubricant ratio) | Graphite shape | Graphite average particle diameter (μm) | Other solid lubricant components |
| 21 | Q125 | 5.5" | 23 # | JFELION ™ | 1 ton (less than three connected pins are assumed) | CPLG screw | MnPhos | 60 | Scaly (flaky) | 5 | PTFE (0.3 μm) |
| 22 | Q125 | 5.5" | 23 # | JFELION ™ | 1 ton (less than three connected pins are assumed) | CPLG screw | MnPhos | 60 | Scaly (flaky) | 5 | PTFE (0.3 μm) |
| 23 | Q125 | 5.5" | 23 # | JFELION ™ | 1 ton (less than three connected pins are assumed) | CPLG screw | MnPhos | 60 | Scaly (flaky) | 5 | PTFE (0.3 μm) |
| 24 | Q125 | 5.5" | 23 # | JFELION ™ | 1 ton (less than three connected pins are assumed) | CPLG screw | MnPhos | 60 | Scaly (flaky) | 5 | PTFE (0.3 μm) |
| 25 | Q125 | 5.5" | 23 # | JFELION ™ | 1 ton (less than three connected pins are assumed) | CPLG screw | MnPhos | 60 | Scaly (flaky) | 5 | PTFE (0.3 μm) |
| 26 | Q125 | 5.5" | 23 # | JFELION ™ | 1 ton (less than three connected pins are assumed) | CPLG screw | MnPhos | 60 | Scaly (flaky) | 5 | PTFE (0.3 μm) |
| 27 | Q125 | 5.5" | 23 # | JFELION ™ | 1 ton (less than three connected pins are assumed) | CPLG screw | MnPhos | 60 | Scaly (flaky) | 5 | PTFE (0.3 μm) |

TABLE 5-continued

| | | | | | | | | | | | |
|---|---|---|---|---|---|---|---|---|---|---|---|
| 28 | Q125 | 5.5" | 23 # | JFELION ™ | 1 ton (less than three connected pins are assumed) | PIN screw | MnPhos | 60 | Scaly (flaky) | 5 | PTFE (0.3 μm) |
| 29 | Q125 | 5.5" | 23 # | JFELION ™ | 1 ton (less than three connected pins are assumed) | Both CPLG screw and PIN screw | MnPhos | 60 | Scaly (flaky) | 5 | PTFE (0.3 μm) |
| 30 | Q125 | 9⅝" | 47 # | JFELION ™ | 3 ton (three or more connected pins are assumed) | CPLG screw | MnPhos | 60 | Scaly (flaky) | 5 | PTFE (0.3 μm) |
| 31 | Q125 | 9⅝" | 47 # | JFELION ™ | 3 ton (three or more connected pins are assumed) | CPLG screw | MnPhos | 60 | Scaly (flaky) | 5 | PTFE (0.3 μm) |
| 32 | Q125 | 9⅝" | 47 # | JFELION ™ | 3 ton (three or more connected pins are assumed) | CPLG screw | MnPhos | 60 | Scaly (flaky) | 5 | PTFE (0.3 μm) |
| 33 | Q125 | 9⅝" | 47 # | JFELION ™ | 3 ton (three or more connected pins are assumed) | CPLG screw | MnPhos | 60 | Scaly (flaky) | 5 | PTFE (0.3 μm) |
| 34 | Q125 | 9⅝" | 47 # | JFELION ™ | 3 ton (three or more connected pins are assumed) | CPLG screw | MnPhos | 60 | Scaly (flaky) | 5 | PTFE (0.3 μm) |
| 35 | L80-13CR | 7" | 38 # | JFELION ™ | 2 ton (three connected pins are assumed) | CPLG screw | Cu-Sn plated | 55 | Scaly (flaky) | ≤1 | PTFE (0.3 μm) Glass fiber |
| 36 | L80-13CR | 7" | 38 # | JFELION ™ | 2 ton (three connected pins are assumed) | CPLG screw | Cu-Sn plated | 70 | Scaly (flaky) | ≤1 | PTFE (0.3 μm) |

| | Binder resin | | | Blending ratio of solid lubricant | |
|---|---|---|---|---|---|
| | (one type or two or more types) | | | Total weight of | |
| No. | PEEK (wt %; total solid lubricant ratio) | PEEK average particle diameter(μm) | Other binder resin components | solid lubricant/ total weight of binder resin (times) | Graphite weight/ total coating weight |
| 21 | 100 | 5 | — | 2.0 | 40 |
| 22 | 100 | 5 | — | 2.0 | 40 |
| 23 | 100 | 5 | — | 2.0 | 40 |
| 24 | 100 | 5 | — | 2.0 | 40 |
| 25 | 100 | 5 | — | 2.0 | 40 |
| 26 | 100 | 5 | — | 2.0 | 40 |
| 27 | 100 | 5 | — | 2.0 | 40 |
| 28 | 100 | 5 | — | 2.0 | 40 |
| 29 | 100 | 5 | — | 2.0 | 40 |
| 30 | 100 | 3 | — | 1.5 | 36 |
| 31 | 100 | 3 | — | 1.5 | 36 |
| 32 | 100 | 3 | — | 1.5 | 36 |
| 33 | 100 | 3 | — | 1.5 | 36 |
| 34 | 100 | 3 | — | 1.5 | 36 |
| 35 | 100 | 5 | — | 1.0 | 28 |
| 36 | 100 | 5 | — | 1.0 | 35 |

TABLE 6

| | Physical property value of solid lubricating coating film | | Blending ratio of solvent | | Solid lubricating film on side where no coating film is applied | | | | | | | |
|---|---|---|---|---|---|---|---|---|---|---|---|---|
| No. | Pencil hardness | Film thickness (μm) | Selection of solvent | Solvent weight/ (solid lubricant weight + binder resin)(%) | Side to which the coating film is not attached | Base | Solid lubricant | Binder resin | Pencil hardness of solid lubricating coating film | Number of M/B times | Whether number of M/B times is acceptable or unacceptable | Remarks |
| 21 | 5H | 5* | MEK | 50 | PIN screw | Shot blasted | PMSQ | Fluororesin | 5B | 5 times<br>5 times<br>6 times | All cases unacceptable/ n = 3 | Comparative example |
| 22 | 5H | 10 | MEK | 50 | PIN screw | Shot blasted | PMSQ | Fluororesin | 5B | ≥10 times (finished in 10 times)<br>≥10 times (finished in 10 times)<br>≥10 times (finished in 10 times) | All cases acceptable/ n = 3 | Inventive example |
| 23 | 5H | 50 | MEK | 50 | PIN screw | Shot blasted | PMSQ | Fluororesin | 5B | ≥10 times (finished in 10 times)<br>≥10 times (finished in 10 times)<br>≥10 times (finished in 10 times) | All cases acceptable/ n = 3 | Inventive example |
| 24 | 5H | 75 | MEK | 50 | PIN screw | Shot blasted | PMSQ | Fluororesin | 5B | ≥10 times (finished in 10 times)<br>≥10 times (finished in 10 times)<br>≥10 times (finished in 10 times) | All cases acceptable/ n = 3 | Inventive example |
| 25 | 5H | 100 | MEK | 50 | PIN screw | Shot blasted | PMSQ | Fluororesin | 5B | 7 times<br>6 times<br>5 times | All cases acceptable/ n = 3 | Inventive example |
| 26 | 5H | 150 | MEK | 50 | PIN screw | Shot blasted | PMSQ | Fluororesin | 5B | 5 times<br>5 times<br>5 times | All cases acceptable/ n = 3 | Inventive example |
| 27 | 5H | 180* | MEK | 50 | PIN screw | Shot blasted | PMSQ | Fluororesin | 5B | 4 times<br>1 time<br>2 times | All cases unacceptable/ n = 3 | Comparative example |
| 28 | 5H | 75 | MEK | 50 | CPLG screw | Shot blasted | PMSQ | Fluororesin | 5B | ≥10 times (finished in 10 times)<br>≥10 times (finished in 10 times)<br>≥10 times (finished in 10 times) | All cases acceptable/ in= 3 | Inventive example |
| 29 | 5H | 75 | MEK | 50 | | | | | | 7 times<br>7 times<br>5 times | All cases acceptable/ n = 3 | Inventive example |
| 30 | 5H | 150 | MIBK | 25* | PIN screw | Shot blasted | Aluminum powder | Aqueous acrylic resin | 3B | 3 times<br>3 times | All cases acceptable/ n = 2 | |
| 31 | 5H | 130 | MIBK | 30 | PIN screw | Shot blasted | Aluminum powder | Aqueous acrylic resin | 3B | 5 times<br>7 times<br>4 times | All cases acceptable/ n = 3 | Inventive example |
| 32 | 5H | 130 | MIBK | 50 | PIN screw | Shot blasted | Aluminum powder | Aqueous acrylic resin | 3B | ≥10 times (finished in 10 times)<br>≥10 times (finished in 10 times)<br>≥10 times (finished in 10 times) | All cases acceptable/ n = 3 | Inventive example |

TABLE 6-continued

| | Physical property value of solid lubricating coating film | | Blending ratio of solvent | | Solid lubricating film on side where no coating film is applied | | | | | | |
|---|---|---|---|---|---|---|---|---|---|---|---|
| No. | Pencil hardness | Film thickness (μm) | Selection of solvent | Solvent weight/ (solid lubricant weight + binder resin)(%) | Side to which the coating film is not attached | Base | Solid lubricant | Binder resin | Pencil hardness of solid lubricating coating film | Number of M/B times | Whether number of M/B times is acceptable or unacceptable | Remarks |
| 33 | 5H | 145 | MIBK | 80 | PIN screw | Shot blasted | Aluminum powder | Aqueous acrylic resin | 3B | ≥10 times (finished in 10 times) ≥10 times (finished in 10 times) ≥10 times (finished in 10 times) | All cases acceptable/ n = 3 | Inventive example |
| 34 | 5H | 150 | MIBK | 90* | PIN screw | Shot blasted | Aluminum powder | Aqueous acrylic resin | 3B | 4 times 3 times 4 times | All cases acceptable/ n = 3 | |
| 35 | 6H | 55 | n-hexane | 50 | PIN screw | Shot blasted | Metal soap (Ste-Ba) | Fluororesin | ≤6B | ≥10 times (finished in 10 times) ≥10 times (finished in 10 times) ≥10 times (finished in 10 times) | All cases acceptable/ n = 3 | Inventive example |
| 36 | 4H | 35 | n-hexane | 75 | PIN screw | Shot blasted | Metal soap (Ste-Ba) | Fluororesin | ≤6B | ≥10 times (finished in 10 times) ≥10 times (finished in 10 times) ≥10 times (finished in 10 times) | All cases acceptable/ n = 3 | Inventive example |

<Nos. 1 to 11>

Nos. 1 to 11 were implemented using steel material grade: carbon steel sour-resistant material C110, connection size: 7"29 #, and connection: JFELION (trademark). In addition, No. 1 to 11 were evaluated in a new laboratory test using a weight of 1.5 ton, under conditions that three connected actual length pins were assumed.

On the coupling side, a base layer and a solid lubricating coating film were formed in this order on a tightening surface as a lubricating coating film. The base layer was an Mn phosphate chemical conversion-treated layer.

In the solid lubricating coating film on the coupling side, graphite was used as the main component of the solid lubricant, and, as the graphite, scaly (flaky grade) graphite having an average particle size of 5 μm or 10 μm was used. As the binder resin, a PEEK resin having an average particle diameter≤1 μm was used. Then, the solid lubricating coating film was formed to have a film thickness of 50 μm.

In No. 1, the tightening surface on the pin connection side remained a shot blasted skin. In Nos. 2 to 11, a solid lubricating coating film formed of PTFE as a solid lubricant and a fluororesin as a binder resin was formed on the tightening surface on the pin connection side.

In Nos. 1 to 4 and 10 and 11, the weight ratios of graphite to the total solid lubricant were compared and reviewed.

No. 1 is a case in which the solid lubricant is formed of only graphite, and all the numbers of times of make-up/ break-out are below the acceptable level. No. 1 is a case where "black tape-shaped secondary products" derived from graphite are formed in a gap between a box connection and a pin connection and clogged, and cause seizure.

Nos. 2 to 4 and 10 are cases in which graphite is contained in a suitable range. In all the cases, the number of times of make-up/break-out exceeds the criterion for acceptance, and the target number of times can be realized. Nos. 2 to 4 and 10 are cases where the graphite content is not set to 100%, graphite is used in a mixed state with another solid lubricant, and graphite is contained in the required amount of 50% or more. As a result, it is considered that high lubrication and the state in which the "black tape-shaped secondary products" are hardly clogged can be achieved.

No. 11 is a case where the graphite content is 40% and is less than the range of the present disclosure. No. 11 is an example in which the lubrication of graphite could not be fully utilized, and seizure occurred due to insufficient lubricity.

In addition, Nos. 4 to 6 are cases where PTFE was used as a secondary solid lubricant, and the particle size of the PTFE was changed for review. From Nos. 4 to 6, both when the PTFE particle size is 10 μm and when the PTFE particle size is 5 μm, the number of make-up/break-out times is within the acceptable range. However, when the PTFE particle size is 10 μm, the lubricity tends to start to decrease slightly as compared with when the PTFE particle size is 5 μm. That is, it can be understood that a PTFE particle size of up to 5 μm is preferable.

Nos. 4, 8, and 9 are examples in which comparison is made in terms of the shape and grade of graphite. They are cases of comparison among scaly (flaky)-grade graphite, scaly (on the leaf vein)-grade graphite, and earthy (amorphous)-grade graphite. No. 8 includes data on an acceptable number of times of make-up/break-out, but also includes data on an unacceptable number of times of make-up/break-out. No. 9 does not reach the acceptance level. Lubrication of graphite is largely due to crystallinity of graphite. Therefore, when the graphite is earthy (amorphous), the number of times of make-up/break-out is less than the acceptable number of times of make-up/break-out. In addition, even in a case where the graphite is scaly (leaf vein-shaped), the result of lubrication is insufficient.

No. 7 is obtained by adding a glass fiber, in addition to PTFE, as another additive of the solid lubricant. No. 7 is a case where the film quality became hard (pencil hardness: 7H) due to the addition of the glass fiber, and, in particular, the number of times of make-up/break-out was not problematic, but rather was improved. In No. 7, it is inferred that a small amount of the film peeled off, from which the "black tape-shaped secondary products" were produced, by virtue of the hardness of the film, contributed to the improvement.

<Nos. 12 to 20>

Nos. 12 to 20 were implemented using steel material grade: carbon steel sour-resistant material C110, connection size: 9⅝" 53.5 #, and connection: JFELION (trademark).

Evaluation was performed using a weight of 3 ton as the weight for the above-described weight tong test, under conditions that three connected actual length pins were assumed.

On the coupling side, a base layer and a solid lubricating coating film were formed in this order on a tightening surface as a lubricating coating film. The base layer was an Mn phosphate chemical conversion-treated layer.

In the solid lubricating coating film on the coupling side, graphite was selected as the main component of the solid lubricant, scaly (flaky grade) graphite was selected as the graphite, and BN was selected as the secondary solid lubricating component. In addition, the main component of the binder resin was a PEEK resin.

As the tightening surface on the pin side, a solid lubricating coating film formed by dispersing a metal soap (Ca stearate) in a fluororesin as the binder resin was formed on a shot blasted skin.

In Nos. 12 to 20, there are observed the average particle size of graphite, the particle size of the PEEK resin, and the possibility of a secondary resin component to be mixed with the PEEK resin.

Nos. 13 and 16 are examples in which the average particle sizes of graphite are 20 μm and 25 μm, respectively, and are cases where the average particle size exceeds 10 μm which is the upper limit of the present disclosure. Nos. 13 and 16 are cases in which the number of times of make-up/break-out is the acceptable number of times of make-up/break-out. In Nos. 13 and 16, the "black tape-shaped secondary products" easily appeared, and caused seizure. In addition, damage due to seizure accumulated, and seizure occurred early.

Nos. 14 to 17 are reviews on conditions under which secondary resin components are mixed into the PEEK resin. From Nos. 14 to 17, it can be seen that, when the PEEK resin is contained in an amount of 70% or more, an acceptable number of times of make-up/break-out can be realized as long as the other defined items are within target specified ranges, even when a composite resin coating film containing, for example, an epoxy resin, a PEKK resin, a PAEK resin, or the like is used to form a solid lubricating coating film.

No. 15 is a comparative example in which 60% of PEEK resin and 40% of PE resin (polypropylene) and PE resin (polyethylene) were mixed. In No. 15, the PEEK resin content was less than the defined value, and a soft resin was added. For this reason, in No. 15, the pencil hardness of the solid lubricating coating film was also lower than the defined value, and the number of times of make-up/break-out was less than the acceptable level.

Among Nos. 14 to 17, No. 17 is also a case of being reinforced with a carbon fiber, and is a case of a more excellent number of times of make-up/break-out. In No. 17, it is presumed that the film quality was hard, the peeling itself of the solid lubricating coating film also decreased, and, as a result, the small amount of the "black tape-shaped secondary products" was small, which contributed to such a more excellent number of times of make-up/break-out.

No. 19 is a case where the average particle diameter of the PEEK resin exceeded 25 μm beyond the range of the present disclosure, and corresponds to a comparative example. In No. 19, the number of times of make-up/break-out does not satisfy the criterion for acceptance. No. 19 indicates that lubrication deteriorates even when the particle size of the PEEK resin is too large.

No. 20 is an example in which the weight of graphite was 25% below the lower limit 50% of the present disclosure, and graphite is not the main component of the solid lubricant. No. 20 is an example where the weight proportion of graphite to the total weight of the solid lubricating coating film (=the weight of the total solid lubricant+the weight of the total binder resin) was 198, which is less than the lower limit 20% of the present disclosure. It is considered that the amount of the "black tape-shaped secondary products" in No. 20 was small because of a small amount of graphite. Furthermore, even in the absence of such products, seizure occurred. This fact of seizure suggests the presence of a necessary amount of graphite enough to properly take advantage of the lubricating effect graphite, and the presence of an optimal range of graphite in order to avoid adverse effects due to graphite peeled off from the solid lubricating coating film at the time of make-up/break-out and causing production of the "black tape-shaped secondary products".

<Nos. 21 to 29>

Nos. 21 to 29 were implemented using steel material grade: carbon steel sour-resistant material Q125, connection size: 5.5"23 #, and connection: JFELION (trademark). Evaluation was performed using a weight of 1 ton, under conditions that a situation where less than three actual length pins were connected was assumed, in the above-described weight tong test.

On the coupling side, a base layer and a solid lubricating coating film were formed in this order on a tightening surface as a lubricating coating film. The base layer was an Mn phosphate chemical conversion-treated layer.

In the solid lubricating coating film on the coupling side, scaly (flaky grade) graphite was selected as the main graphite component, and PTFE was selected as the secondary solid lubricating component. In addition, the main component of the binder resin was a PEEK resin.

As the tightening surface on the pin side, a solid lubricating coating film using a fluororesin as a binder resin and PMSQ (polymethyl silsesquioxane) as a solid lubricant, which was provided a shot blasted skin, was reviewed.

In Cases Nos. 21 to 27, the thickness of the solid lubricating coating film was reviewed.

From Nos. 21 to 27, it was found that an excellent number of times of tightening/break-out was exhibited when the film thickness was in the range of 10 μm to 150 μm. In the cases of No. 21 (5 μm) and No. 27 (180 μm) in which the film thickness is out of the range of the present disclosure, the number of times of make-up/break-out does not satisfy the criterion for acceptance.

From Nos. 21 to 27, more excellent lubrication (number of times of make-up/break-out) was obtained, especially in the case where the film thickness was in the range of 10 to 75 μm.

In Nos. 24, 28, and 29, the effects obtained by forming the solid lubricating coating film on either one or both of the coupling side and the pin side are compared. Among Nos. 21 to 27, the cases other than these three cases are all examples in which a solid lubricating coating film mainly formed of a combination of graphite and a PEEK resin was formed on the coupling side, and a soft film is formed or no film was formed on the pin side.

From Nos. 21 to 27, it was found that, in general, when the solid lubricating coating film of the present disclosure is attached to the coupling side, the film structure of the present disclosure can maintain sufficient lubricity.

On the other hand, No. 28 is an example in which the solid lubricating coating film on the pin side and the solid lubricating coating film on the coupling side were replaced with each other. From the comparison between No. 28 and No. 24, it can be seen that even when the solid lubricating coating films are replaced with each other, the lubricity hardly changes and is favorable.

No. 29 is a case in which a solid lubricating coating film mainly formed of a combination of graphite and a PEEK resin was formed on both the pin side and the coupling side. No. 29 is slightly inferior in number of times of make-up/break-out to Nos. 24 and 28, but exhibits a value determined as sufficiently acceptable.

<Nos. 30 to 34>

Cases Nos. 30 to 34 were implemented using steel material grade: carbon steel sour-resistant material Q125, connection size: 9⅝" 47 #, and connection: JFELION (trademark). In addition, No. 30 to 34 were evaluated in a new laboratory test using a weight of 3 ton, under conditions that three connected actual length pins were assumed.

On the coupling side, a base layer and a solid lubricating coating film were formed in this order on a tightening surface as a lubricating coating film. The base layer was an Mn phosphate chemical conversion-treated layer.

In the solid lubricating coating film on the coupling side, graphite was selected as the main component of the solid lubricant, scaly (flaky grade) graphite was selected as the shape of the graphite, and PTFE was selected as the secondary solid lubricating component. In addition, the main component of the binder resin was a PEEK resin.

This is a case in which a solid lubricating coating film in which the binder resin was formed of an aqueous acrylic resin and the solid lubricant was formed of an aluminum powder was formed on the shot blasted skin as the tightening surface on the pin side.

In Cases Nos. 30 to 33, the weight % of the solvent weight relative to the weight of the film component (=the weight of the solid lubricant+the binder resin) was reviewed.

In Case No. 30 in which the solvent weight fell below the lower limit of the suitable range of the present disclosure, and Case No. 34 in which the solvent weight exceeded the upper limit of the suitable range of the present disclosure, the number of times of make-up/break-out was barely acceptable (about three times).

In a state where the solvent was concentrated, for example, in No. 30, mixing of graphite and PTFE was not sufficient, and their concentrations were locally uneven. As a result, graphite was not uniform throughout the solid lubricating coating film. For this reason, there is an increased concern that the "black tape-shaped secondary products" might be produced nonuniformly, and the possibility of seizure increases.

In No. 34, graphite and PTFE are mixed sufficiently. However, in No. 34, the concentration of the solvent is low, and thus graphite, of graphite and PTFE, floats and collects on the surface when a film is formed and gradually dried in the air. Therefore, there is an increased concern that, when a film is then formed by firing, graphite might be unevenly distributed on the surface side of the solid lubricating coating film. As a result, the mechanism of increase in possibility of seizure can be assumed. As described above, it can be understood that the solvent weight needs to be set within a stable range.

<Nos. 35 to 34 and Nos. 35 to 36>

Cases Nos. 35 to 36 were implemented using steel material grade: stainless steel material: L80-13CR, connection size: 7"38 #, and connection: JFEBEAR (trademark). In addition, Nos. 35 to 36 were evaluated in a new laboratory test using a weight of 2 ton, under conditions that three connected actual length pins were assumed.

On the coupling side, a base layer and a solid lubricating coating film were formed in this order on a tightening surface as a lubricating coating film. The base layer was a binary electroplating layer of Cu and Sn.

In the solid lubricating coating film on the coupling side, graphite was selected as the main component of the solid lubricant, scaly (flaky grade) graphite was selected as the graphite, and PTFE was selected as the secondary solid lubricating component. Glass fiber was also contained in No. 35. In addition, the main component of the binder resin was a PEEK resin.

On the pin side, a solid lubricating coating film formed of a fluororesin as a binder resin and a metal soap (Ba stearate) as a solid lubricant was formed on the shot blasting skin.

Nos. 35 to 36 relate to application cases to stainless steel materials. In particular, No. 35 is also a case in which a glass fiber was also added to increase the film hardness. It was found that Nos. 35 to 36 both exhibited excellent lubrication characteristics.

Here, the Example described above has been illustrated using the connection for oil country tubular goods. This Example illustrates cases not only of the lubrication behavior merely starting upon contact between two objects to be rubbed in the lubrication, but also where the lubricating coating film is subjected to severe lubrication conditions including peeling and partial destruction due to the material to be rubbed, in a situation in which the threads are not engaged with each other. Therefore, the present disclosure can also be applied to lubrication starting upon contact between two objects to be rubbed, and can also be applied to materials other than the connection for oil country tubular goods material and application fields as long as the structure of the lubricating coating film is used.

Example 2

In Example 2, the anticorrosion property was evaluated by a salt water spray test.

Among the cases shown in Tables 1 to 6, the configurations of No. 3, 10, and 22 were evaluated by performing salt water spraying. These cases are under carbon steel-based connection for oil country tubular goods conditions.

In Example 2, for this salt water spray test, a solid lubricating coating film was newly formed on a new coupling sample.

In addition, as a comparative example, SPCC (ordinary general mild steel thin steel sheet/cold rolled annealed sheet) having a thickness of 0.8 mmt was also used.

Then, for evaluation, both ends of the coupling connection were made up and broken out once with a protector. Then, the salt water spray test was performed on the case where the coupling connection remained as it was and the case where the protector was attached again (corresponding to the second make-up), and the coupling threads were aligned side by side for a predetermined time (meaning that they did not stand) and evaluated.

The outside of the coupling material was protected by applying an imide tape.

Detailed conditions are as follows.

<Salt Water Spray Condition>
Spray conditions: JIS K 5600-7-1
Salt water concentration: 5±0.5 wt %
Temperature: 35° C.
Humidity: 98 to 99%
Amount of salt water sprayed: 1 to 2 ml/hr/80 cm2
pH: 6.5 to 7.2
Period of time: 24 hr Here, in the comparative example, the SPCC sheet cut into a size of 75 mm×150 mm was used as a sample, and the same film as No. 3 was formed on the surface. That is, after the Mn phosphate treatment, an agent was applied and fired to form a solid lubricating coating film. In addition, two samples were prepared, and one side was protected with an imide tape. Furthermore, the back sides (test target side) of the two samples were entirely attached with a protective film, and an imide tape was attached at 1 mm from their end. The materials were used as samples. One of the two samples was cross-cut with a cutter knife (No. A), and the other sample was used as it was (No. B).

As for Nos. 3, 10, and 22, the samples (No. 3-2, 10-2, and 22-2) which were made up and broken out once with a protector, and then made up again, attached with the protector, sprayed with salt water and the samples (No. 3-3, 10-3, and 22-3) which were made up and broken out once with the protector and then sprayed with salt water directly were evaluated.

No. 3-4 is an example in which the salt water spray test was performed on the sample without make-up/break-out the sample with the protector.

The significance of this test method is as follows. In many cases, the connection for oil country tubular goods are shipped after its ends are made up with a protector, and is stored as it is in a yard near a well. Therefore, salt water was sprayed to create an environment under conditions close to actual use conditions.

The condition that the protector is not attached means a more severe condition when the protector is detached. No. 3-4 is a case where no make-up/break-out was performed with the protector, and the corrosion resistance of the film itself is viewed in a connection shape.

The results are shown in Table 7.

TABLE 7

| No. | Steel type | OD (inch) | WT (LPF) | Screw type | Treatment before salt water spraying | Sample situation at salt water spraying | Corrosion result | Remarks |
|---|---|---|---|---|---|---|---|---|
| A | SPCC | 75 mm × 150 mm X t0.8 mm | | (Thin steel sheet) | Cross cut (Entire back surface: imide tape) (With imide tape at 10 mm from evaluation-side end surface) | Leaned diagonally (set on a vinyl chloride comb-shaped jig) | Rust developed at cross-cut portion | Comparative reference example |
| B | SPCC | 75 mm × 150 mm X t0.8 mm | | (Thin steel sheet) | None (Entire back surface: imide tape) (With imide tape at 10 mm from evaluation-side end surface) | Leaned diagonally (set on a vinyl chloride comb-shaped jig) | No corrosion | Comparative reference example |
| 3-2 | C110 | 7" | 29 # | JFELION™ CPLG screw | One Make/Break with protector | Placed horizontally on salt spray device (meaning not standing), with protector attached | No corrosion | Inventive example |
| 3-3 | C110 | 7" | 29 # | JFELION™ CPLG screw | One Make/Break with protector | Placed horizontally on salt spray device (meaning not standing) as it is | No corrosion | Inventive example |
| 3-4 | C110 | 7" | 29 # | JFELION™ CPLG screw | None | Placed horizontally on salt spray device (meaning not standing) as it is | No corrosion | Inventive example |
| 10-2 | C110 | 7" | 29 # | JFELION™ CPLG screw | One Make/Break with protector | Placed horizontally on salt spray device (meaning not standing), with protector attached | No corrosion | Inventive example |
| 10-3 | C110 | 7" | 29 # | JFELION™ CPLG screw | One Make/Break with protector | Placed horizontally on salt spray device (meaning not standing) as it is | No corrosion | Inventive example |
| 22-2 | Q125 | 5.5' | 23 # | JFELION™ CPLG screw | One Make/Break with protector | Placed horizontally on salt spray device (meaning not standing), with protector attached | No corrosion | Inventive example |
| 22-3 | Q125 | 5.5 | 23 # | JFELION™ CPLG screw | One Make/Break with protector | Placed horizontally on salt spray device (meaning not standing) as it is | No corrosion | Inventive example |

Comparative Case No. A is a case in which Solid lubricating coating film No. 3 was formed on an SPCC thin steel sheet, the SPCC thin steel sheet was cross-cut, and the film was scratched so that the scratch reached the base. In Comparative Case No. A, rust was observed at the cross-cut portion. On the other hand, the film itself, which was not cross-cut, was excellent in corrosion resistance, and no corrosion was observed.

Corrosion was not confirmed in any of Nos. 3-2 to 3-4, Nos. 10-2 to 10-3, and Nos. 22-2 to 22-3 while they were all sound. This demonstrated that the solid lubricating coating film of the present disclosure was also excellent in corrosion resistance.

Graphite itself and PEEK resin itself have water repellency and are excellent in corrosion resistance. In addition, the solid lubricating coating film is a film that is hard enough not to be broken under conditions that make-up/break-out is performed with the protector. For this reason, it is considered that such corrosion resistance was exhibited because no minute crack was formed. In short, the condition of No. A in which the film is cross-cut with a cutter knife indicates that the film is not broken even when made up and broken out with the proctor under conditions that are too severe for the solid lubricating coating film. At the same time, it was found that a solid lubricating coating film having this composition, when formed, exhibits favorable corrosion resistance.

As described above, it could be proved that the solid lubricating coating film formed using the agent is defined in the scope as defined in the present disclosure, and thus can ensure lubricity and corrosion resistance. It is important to perform lubrication during make-up/break-out of the connection using the solid lubricating coating film, which has been consistently described in the present disclosure, through the use of trace soap components in order that the solid lubricating coating film is not damaged when there is "allowance (backlash)" until the threads are engaged. In addition, after the threads are engaged, lubrication is performed from a close adhesion state. The two lubrication processes are well controlled, and thus lucubration can be achieved.

Here, the entire content of Japanese Patent Application No. 2021-91462 (filed on May 31, 2021), the priority of which is claimed by the present application, forms a part of the present disclosure by reference. Although the description has been made with reference to a limited number of embodiments, the scope of rights is not limited thereto, and modifications of each embodiment based on the above disclosure are obvious to those skilled in the art.

REFERENCE SIGNS LIST

1 Pin
1a Male thread
2 Box (coupling)
2a Female thread
3 Weight
3A Weight main body
4 Power Tong
10A Solid lubricating coating film
10B Base layer
12 Penetration rod
13 Insertion rod
20 Lifting device (crane)
21 Chain (suspension chain)

The invention claimed is:

1. An agent for forming a solid lubricating coating film with a thickness of 10 μm or more and 150 μm or less in a thread portion of oil country tubular goods, wherein
   two or more types of solid lubricants dispersed in a binder resin,
   the combination of solid lubricants comprises:
      graphite in an amount of 50% or more and 90% or less of a total weight of the solid lubricants, the graphite having a scaly shape and an average particle diameter of 10.0 μm or less, and
   one or more solid lubricants selected from the group consisting of: BN (boron nitride), mica, talc, MCA (melamine cyanurate), MoS$_2$ (molybdenum disulfide), PTFE (polytetrafluoroethylene), PFA (perfluoroalkoxyalkane; tetrafluoroethylene-perfluoroalkoxyethylene copolymer resin), and FEP (perfluoroethylene propene copolymer; tetrafluoroethylene-hexafluoropropylene copolymer) as other solid lubricants,
   the binder resin contains a PEEK resin having an average particle diameter of 20 μm or less as a main component, the PEEK resin being contained in an amount of 70% or more of a total weight of the binder resin,
   the total weight of the solid lubricants is 0.8 times or more and 2 times or less the total weight of the binder resin,
   a content of the graphite as the solid lubricant is 28% or more and 45% or less of a sum of the total weight of the solid lubricants and the total weight of the binder resin, and
   an average particle diameter of the other solid lubricants is in a range of 0.1 μm or more and 5 μm or less.

2. The agent for forming a solid lubricating coating film according to claim 1, comprising
   a solvent, wherein
   a weight ratio of the solvent is 30% or more and 80% or less with respect to a weight of the sum of the total weight of the solid lubricants and the total weight of the binder resin.

3. The agent for forming a solid lubricating coating film according to claim 1, wherein
   the combination of the solid lubricants comprises PTFE.

4. An oil country tubular goods comprising a lubricating coating film including a solid lubricating coating film, the lubricating coating film being formed in a thread portion, wherein
   the solid lubricating coating film is formed by dispersing two or more types of solid lubricants in a binder resin,
   the combination of solid lubricants comprises:
      graphite in an amount of 50% or more and 90% or less of a total weight of the solid lubricants, the graphite having a scaly shape and an average particle diameter of 10.0 μm or less, and
   one or more solid lubricants selected from the group consisting of: BN (boron nitride), mica, talc, MCA (melamine cyanurate), MoS$_2$ (molybdenum disulfide), PTFE (polytetrafluoroethylene), PFA (perfluoroalkoxyalkane; tetrafluoroethylene-perfluoroalkoxyethylene copolymer resin), and FEP (perfluoroethylene propene copolymer; tetrafluoroethylene-hexafluoropropylene copolymer) as other solid lubricants,
   the binder resin contains a PEEK resin having an average particle diameter of 20 μm or less as a main component, the PEEK resin being contained in an amount of 70% or more of a total weight of the binder resin, the total weight of the solid lubricants is 0.8 times or more and 2 times or less the total weight of the binder resin, a content of the graphite as the solid lubricant is 28% or more and 45% or less of a sum of the total weight of the solid lubricants and the total weight of the binder resin, an average particle diameter of the other solid lubricants is in a range of 0.1 µm or more and 5 µm or less, and the solid lubricating coating film has a film thickness of 10 µm or more and 150 µm or less.

5. The oil country tubular goods according to claim 4, wherein the combination of the solid lubricants comprises PTFE.

6. The oil country tubular goods according to claim 4, wherein the solid lubricating coating film comprises a thread of the thread portion and is formed up to a region adjacent to the thread.

7. The oil country tubular goods according to claim 4, wherein the solid lubricating coating film has a hardness of 3H or more as pencil hardness.

8. The oil country tubular goods according to claim 4, wherein a material for the oil country tubular goods are carbon steel or low alloy steel, and the lubricating coating film has a base layer between a tightening surface of the thread portion and the solid lubricating coating film, the base layer being formed of an electroplating film or a chemical conversion-treated film.

9. The oil country tubular goods according to claim 4, wherein a material for the oil country tubular goods are a stainless steel material, an Ni-based alloy, or a Ti alloy, and the lubricating coating film has a base layer between a surface of the thread portion and the solid lubricating coating film, the base layer being formed of an electroplating film.

10. A threaded joint for oil country tubular goods configured to connect a box having a female thread and a pin having a male thread, wherein at least one oil country tubular goods of the box and the pin is formed of the oil country tubular goods according to claim 4 which is formed with the lubricating coating film.

11. The threaded joint for oil country tubular goods according to claim 10, wherein a lubricating coating film including the solid lubricating coating film is formed on a tightening surface of a thread portion of one component of the box and the pin, and a film softer than the solid lubricating coating film is formed on a tightening surface of a thread portion of the other component of the box and the pin.

12. The threaded joint for oil country tubular goods according to claim 11, wherein the softer film has a film hardness of 4B or less as pencil hardness.

13. A method for manufacturing the oil country tubular goods according to claim 4, the method comprising:

using the agent for forming the solid lubricating coating film in the thread portion of oil country tubular goods, performing a film formation step of applying the agent to form a solid lubricating coating film having a film thickness of 50 µm or less repeatedly a plurality of times with a temporary drying step interposed between the film formation steps until a target total film thickness is attained;

performing a main drying step after the last film formation step, the main drying step being performed by firing, infrared irradiation, ultraviolet irradiation, or by a drying means with hot air, or by a means of leaving in the air or natural drying; and adjusting a total film thickness of the solid lubricating coating film to 10 µm or more and 150 µm or less.

14. The agent for forming a solid lubricating coating film according to claim 2, wherein the combination of the solid lubricants comprises PTFE.

* * * * *